US010738528B2

(12) United States Patent
Briese et al.

(10) Patent No.: US 10,738,528 B2
(45) Date of Patent: Aug. 11, 2020

(54) INSULATING GLASS UNIT FLUID EXCHANGE ASSEMBLY AND METHOD

(71) Applicant: GED Integrated Solutions, Inc., Glenwillow, OH (US)

(72) Inventors: William A. Briese, Hinckley, OH (US); John Grismer, Cuyahoga Falls, OH (US); Steven W. Pesek, Hinckley, OH (US); Paul A. Hofener, Parma, OH (US); Brady S. Jacot, Stow, OH (US); Jason Rody, Ravenna, OH (US)

(73) Assignee: GED Integrated Solutions, Inc., Glenwillow, OH (US)

( * ) Notice: Subject to any disclaimer, the term of this patent is extended or adjusted under 35 U.S.C. 154(b) by 0 days.

(21) Appl. No.: 16/051,966

(22) Filed: Aug. 1, 2018

(65) Prior Publication Data

US 2019/0040674 A1 Feb. 7, 2019

Related U.S. Application Data

(60) Provisional application No. 62/539,779, filed on Aug. 1, 2017, provisional application No. 62/629,785, filed on Feb. 13, 2018.

(51) Int. Cl.
*E06B 3/677* (2006.01)
*B25J 9/06* (2006.01)
(Continued)

(52) U.S. Cl.
CPC ........... *E06B 3/6775* (2013.01); *B25J 9/1684* (2013.01); *B25J 9/1687* (2013.01); *B25J 11/00* (2013.01);
(Continued)

(58) Field of Classification Search
CPC . E06B 3/677; E06B 3/6775; B25J 9/06; B25J 9/20; B25J 19/021
See application file for complete search history.

(56) References Cited

U.S. PATENT DOCUMENTS

| 6,158,483 A | 12/2000 | Trpkovski |
| 7,184,146 B2 | 2/2007 | Trpkovski |

(Continued)

OTHER PUBLICATIONS

International Search Report in corresponding international patent application No. PCT/US18/44805 dated Oct. 23, 2018. (7 pages).
(Continued)

*Primary Examiner* — Marina A Tietjen
*Assistant Examiner* — Paul J Gray
(74) *Attorney, Agent, or Firm* — Tarolli, Sundheim, Covell & Tummino LLP; John A. Yirga, Esq.

(57) ABSTRACT

A fluid exchanging system and method for use in exchanging fluids in insulating glass units (IGUs). The fluid exchanging system includes an articulating arm having a plurality of members and arms to allow movement about multiple axes defined by the articulating arm, an optical sensor system, coupled to the articulating arm, for identifying an opening in a spacer frame of an IGU, and a fluid exchanging apparatus releasably couplable to the articulating arm. The fluid exchanging apparatus also includes a fluid exchanging head for evacuating atmospheric air from the IGU and dispensing fluid into the IGU.

20 Claims, 25 Drawing Sheets

(51) Int. Cl.
*B25J 9/20* (2006.01)
*B25J 19/02* (2006.01)
*B25J 9/16* (2006.01)
*B25J 11/00* (2006.01)
*E06B 3/673* (2006.01)
*E06B 3/67* (2006.01)

(52) U.S. Cl.
CPC ......... *B25J 19/021* (2013.01); *E06B 3/67391* (2013.01); *E06B 3/6715* (2013.01)

(56) References Cited

U.S. PATENT DOCUMENTS

| | | |
|---|---|---|
| 8,435,367 B2 | 5/2013 | Donohue |
| 2012/0234466 A1 | 9/2012 | Balbi |
| 2014/0201969 A1 | 7/2014 | Pemberton |
| 2016/0339553 A1* | 11/2016 | Nakazawa ............. B23Q 11/10 |
| 2017/0217013 A1* | 8/2017 | Iqtidar .................... B25J 5/007 |

OTHER PUBLICATIONS

Notification Concerning Transmittal of International Preliminary Report on Patentability for PCT/US18/044805 dated Feb. 4, 2020. (6 pages).

* cited by examiner

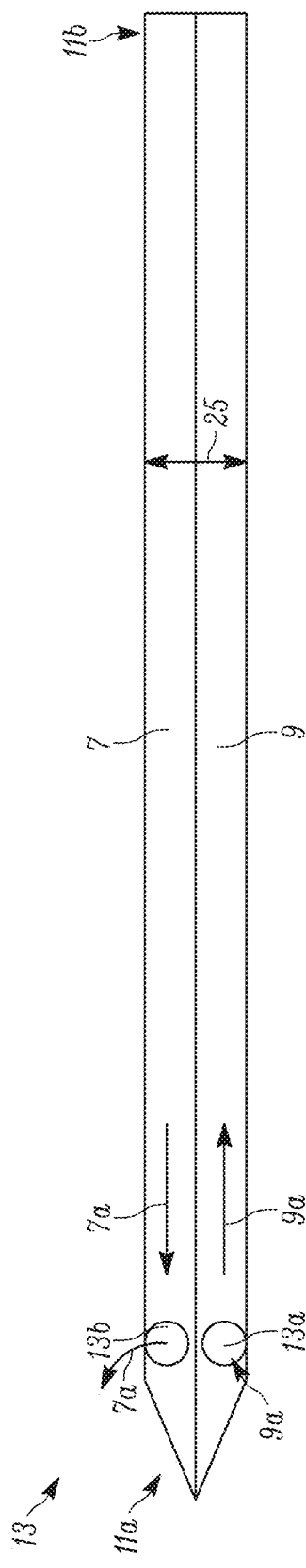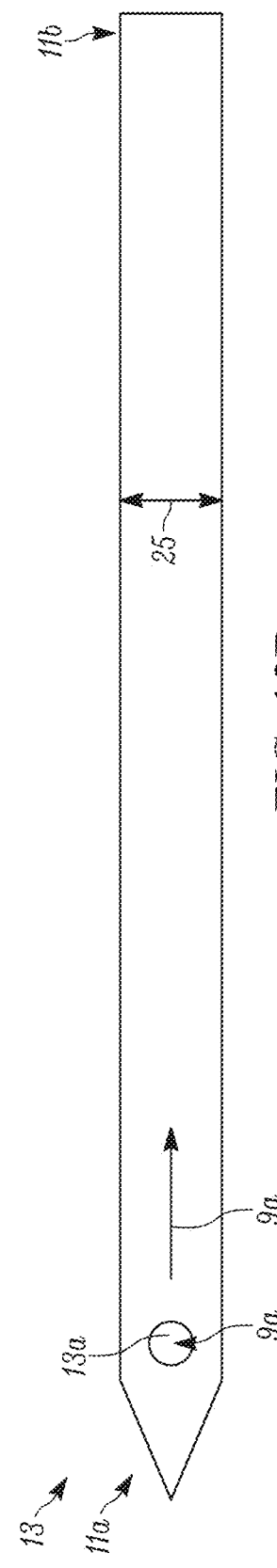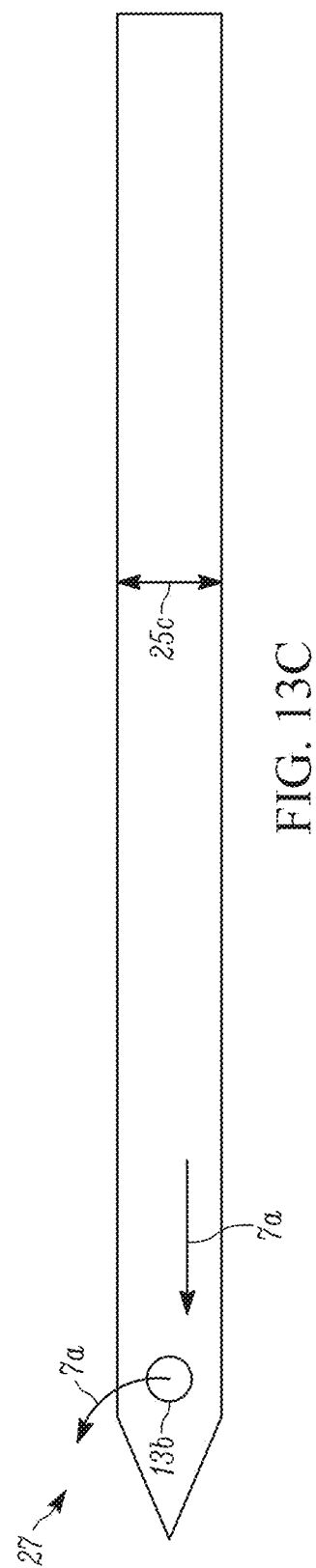

INSULATING GLASS UNIT FLUID EXCHANGE ASSEMBLY AND METHOD

CROSS REFERENCES TO RELATED APPLICATIONS

The Ser. No. 62/539,779 filed Aug. 1, 2017 entitled INSULATING GLASS following application claims priority under 35 U.S.C. 119(e) to U.S. Provisional Patent Application Ser. No. 62/629,785 filed Feb. 13, 2018 entitled INSULATING GLASS UNIT PLUG AND INSTALLATION METHOD, AND U.S. Provisional patent application UNIT FLUID EXCHANGE ASSEMBLY AND METHOD. The above-identified provisional applications are incorporated herein by reference in their entireties for all purposes.

TECHNICAL FIELD

The present disclosure relates to an insulting glass unit (IGU) fluid exchanging system and method, and more particularly, a fluid exchanging assembly and method having tool utilization and spatial recognition for more accurately placing a fluid exchanging head into the IGU.

BACKGROUND

Insulating glass units (IGUs) are used in windows to reduce heat loss from building interiors during cold weather. IGUs are typically formed by a spacer assembly sandwiched between glass lites. A spacer assembly usually comprises a spacer frame extending peripherally about the unit, a sealant material adhered both to the glass lites and the spacer frame, and a desiccant for absorbing atmospheric moisture within the unit. The margins or the glass lites are flush with or extend slightly outwardly from the spacer assembly. The sealant extends continuously about the spacer frame periphery and its opposite sides so that the space within the IGUs is hermetic. The sealant provides a barrier between atmospheric air and the IGU interior, which blocks entry of atmospheric water vapor.

Typically, sealant is manually applied around a majority of the spacer frame periphery, while leaving a small opening formed through the spacer frame uncovered, or free from sealant. The atmospheric air is evacuated and an inert gas is inserted into the space within the IGU. The inert gas is typically inserted via a needle, however the needle is delicate and easily bent. Additionally, if improperly inserted, the needle scratches the glass of the lites. The evacuation of the atmospheric air and insertion of the inert gas is a rate-limiting step of IGU assembly. A rivet or screw, or other fastener is inserted into the opening, and additional sealant is then applied over the uncovered area. Particulate desiccant is typically deposited inside the spacer frame and communicates with air trapped in the IGU interior to remove the entrapped airborne water vapor, and as such, precludes condensation within the unit.

SUMMARY

One example embodiment of the present disclosure includes a fluid exchanging system for use in dispensing fluid into insulating glass units (IGUs) comprising an articulating arm having a plurality of members and arms to allow movement about multiple axes defined by the articulating arm, an optical sensor system, coupled to the articulating arm, for identifying an opening in a spacer frame of an IGU, and a fluid exchanging apparatus releasably couplable to the articulating arm. The fluid exchanging apparatus comprises a fluid exchanging head for evacuating atmospheric air from the IGU and dispensing fluid into the IGU.

Another example embodiment of the present disclosure comprises a method of constructing a fluid exchanging system for use in filling insulating glass units (IGUs). The method comprises the steps of assembling a fluid exchanging apparatus comprising a releasably couplable element configured to be coupled to an articulating arm and a fluid exchanging head for evacuating air and dispensing fluid into an IGU. The method further comprises the steps of coupling an optical sensor system to articulating arm to identify an opening in the IGU and coupling an alignment apparatus to the articulating arm. The alignment apparatus comprising a probe for entering the opening. The method additionally comprises the steps of connecting the optical sensor system, the articulating arm, the alignment apparatus, and the fluid exchanging apparatus to a controller. The controller configured to receive information from the optical system, the alignment apparatus, and the fluid exchanging apparatus, and instruct the articulating arm based upon said information.

Yet another example embodiment of the present disclosure includes a fluid exchanging system for use in dispensing fluid into insulating glass units (IGUs) comprising an articulating arm having a plurality of members and arms to allow movement about multiple axes defined by the articulating arm, an optical sensor system, coupled to the articulating arm, for identifying an opening in a spacer frame of an IGU, a probe attached to the articulating arm for confirming a location and clearance of the opening, a fluid exchanging apparatus releasably couplable to the articulating arm and a controller in instructive communication with at least one of the articulating arm, the optical sensor system, and the fluid exchanging apparatus, wherein at least one of the articulating arm, the optical sensor system, and the fluid exchanging apparatus are enabled and actuated by instructions from the controller. The fluid exchanging apparatus comprises a fluid exchanging head for evacuating atmospheric air from the IGU and dispensing fluid into the IGU.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which:

FIG. 13A is a section view of a first example embodiment of the fluid exchanging head of FIG. 13 taken along section lines 13A-13A;

FIG. 13B is a section view of a second example embodiment of the fluid exchanging head of FIG. 13 taken along section lines 13A-13A, the fluid exchanging head performing a first functionality;

FIG. 13C is a section view of a second example embodiment of the fluid exchanging head of FIG. 13 taken along section lines 13A-13A, the fluid exchanging head performing a second functionality;

Figure 1:
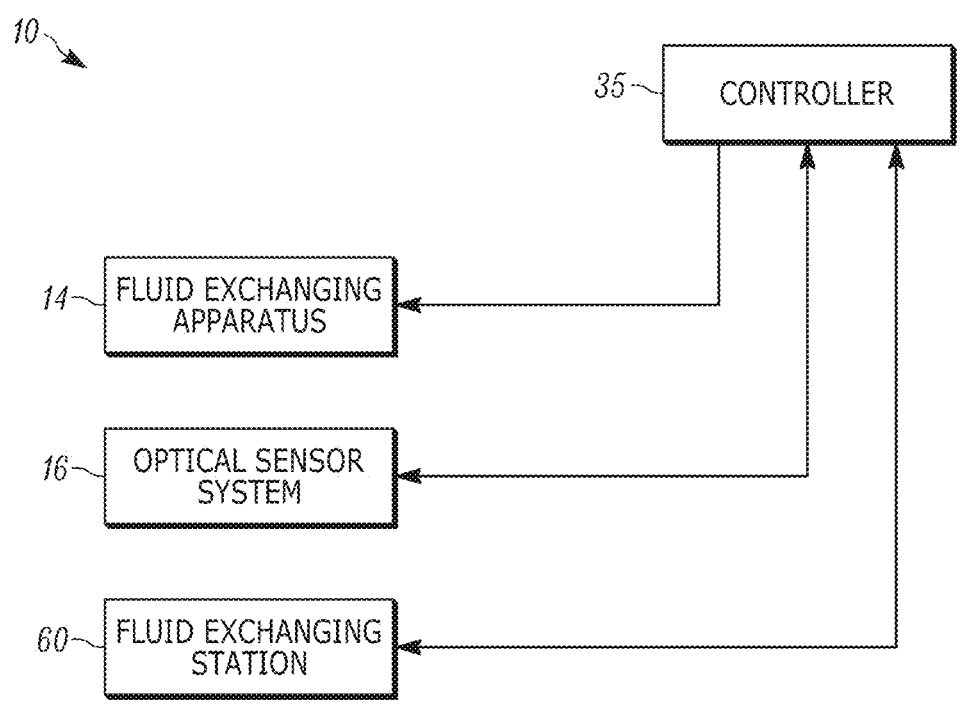
FIG. 1 is an overview schematic block diagram of a fluid exchanging processing system.
Figure 2:
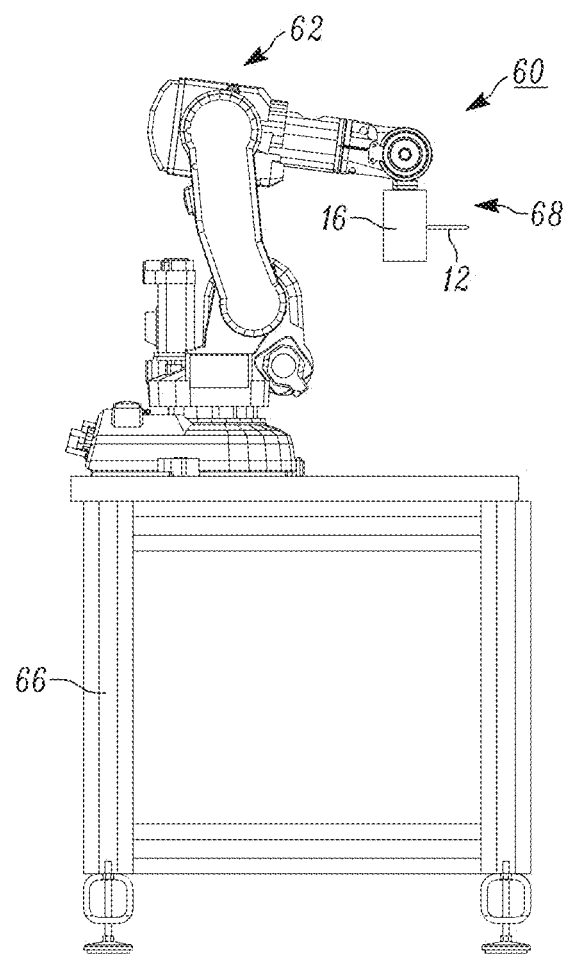
FIG. 2 is a right side elevation view of a fluid exchanging station in accordance with one example embodiment of the present disclosure.
Figure 3:
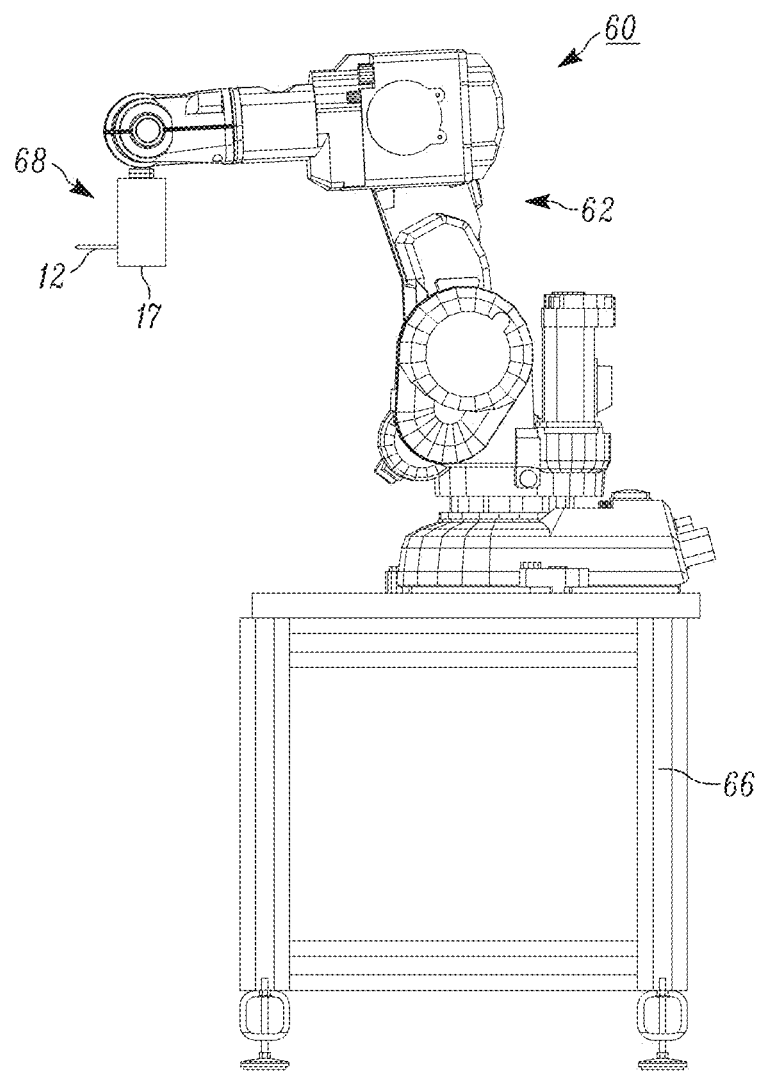
FIG. 3 is a left side elevation view of the fluid filler station of FIG. 2.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure relates to an insulting glass unit (IGU) fluid exchanging system and method, and more particularly, a fluid exchanging assembly and method having tool utilization and spatial recognition for more accurately placing a fluid exchanging nozzle into the IGU.

Figure 8:
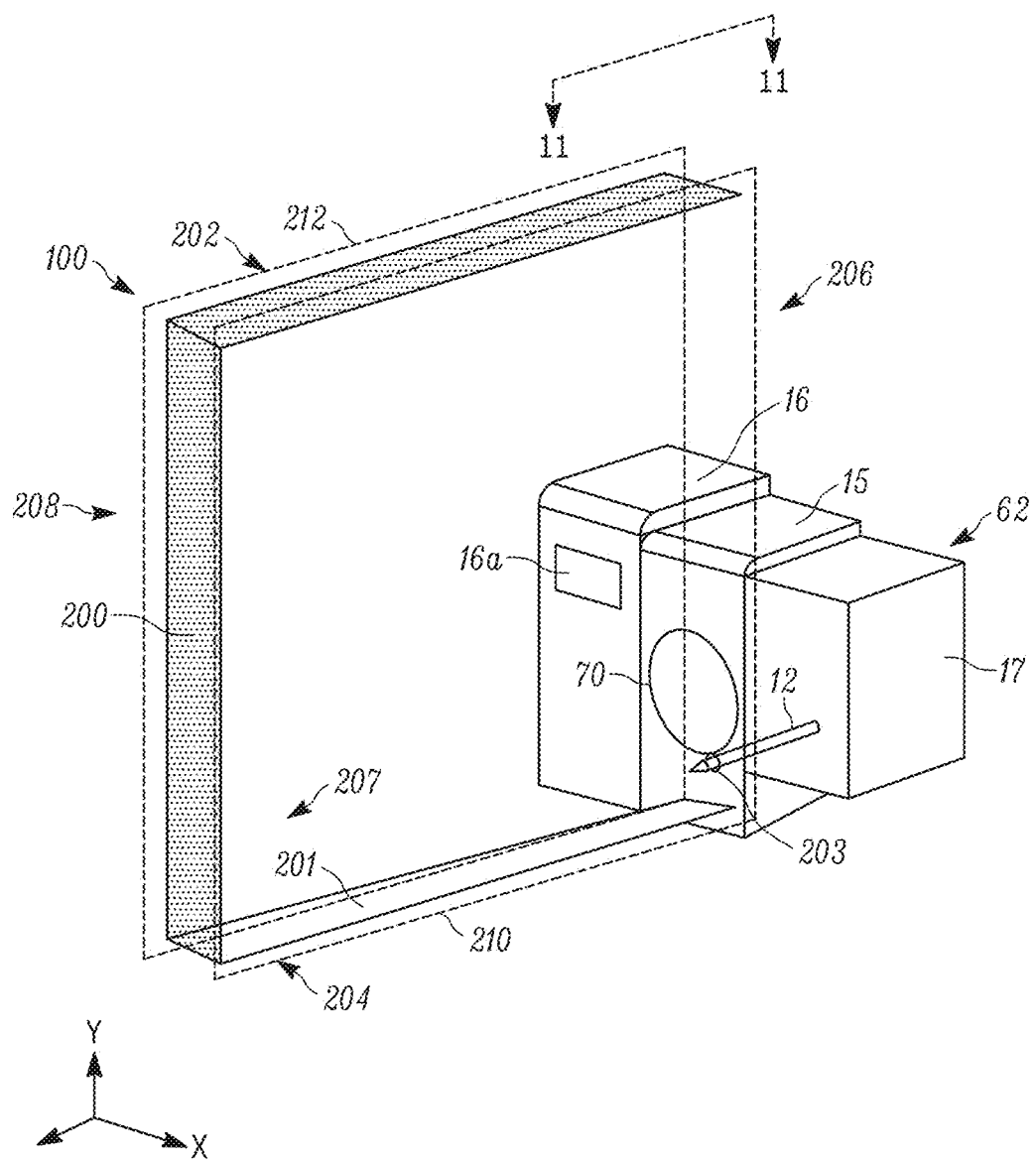
FIG. 8 is a simplified front perspective view of a probe of the fluid exchanging station interacting with an IGU.
Figure 9:
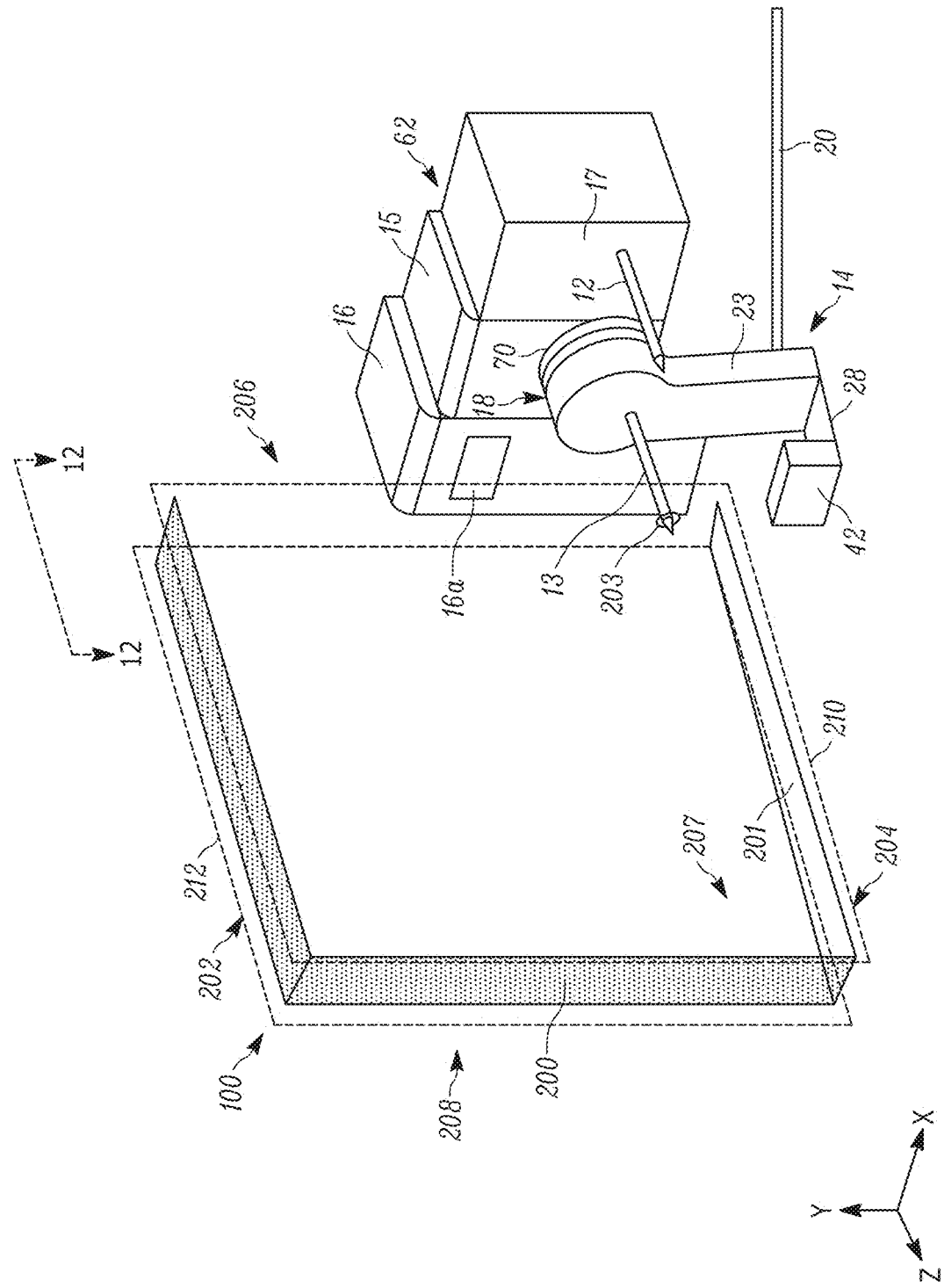
FIG. 9 is a simplified front perspective view of a fluid exchanging apparatus and optical sensor system coupled to the fluid exchanging station interacting with an IGU.
Figure 9A:
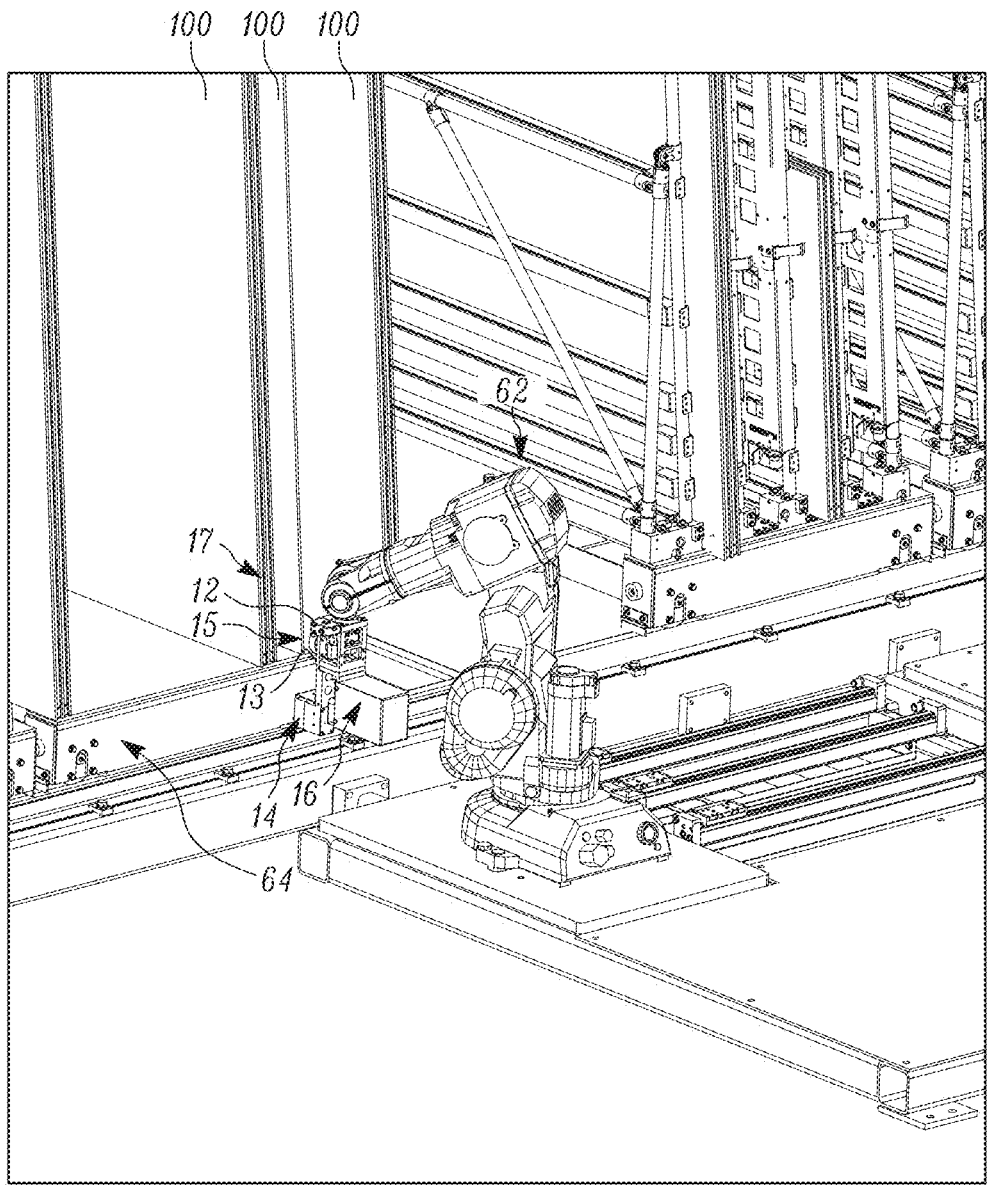
FIG. 9A is a rear perspective view of a fluid exchanging apparatus and optical sensor system coupled to the fluid exchanging station interacting with an IGU.
Figure 10:
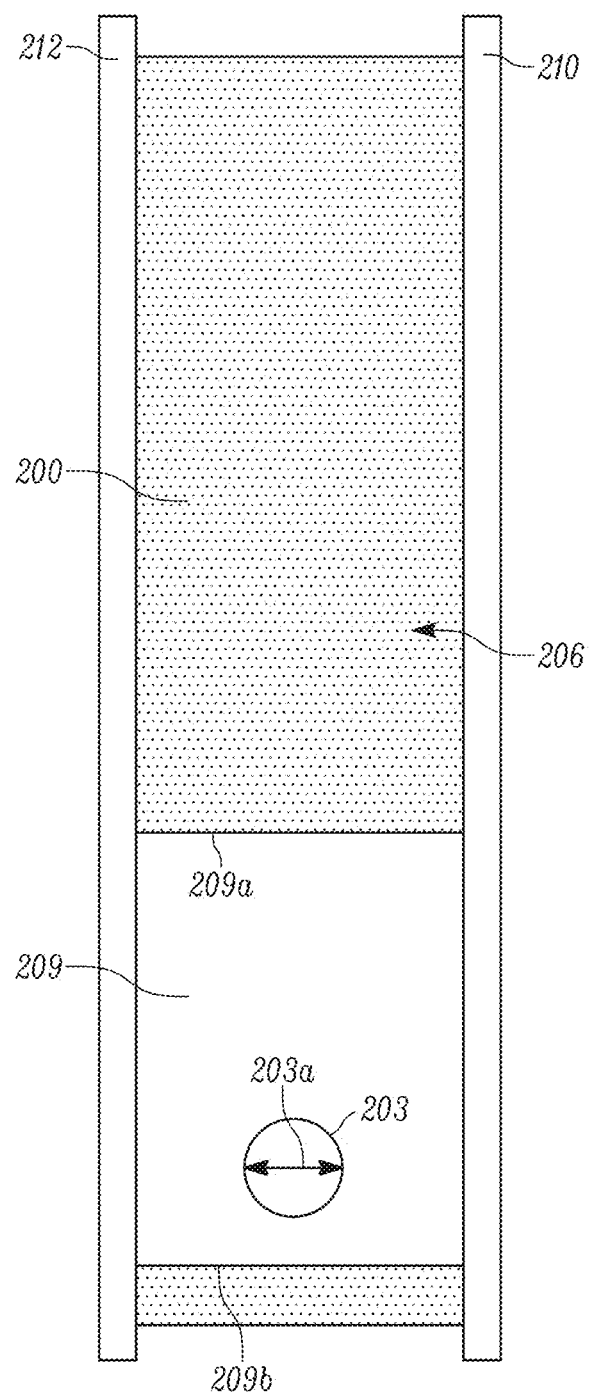
FIG. 10 is a front elevation view of a partially constructed insulating glass unit (IGU)

FIG. 1 schematically depicts a fluid exchanging system 10 for dispensing fluid, particularly gasses, into window frames or insulating glass units (hereinafter IGUs 100). The IGUs 100 comprise one or more glass lites 210, 212, spaced by a spacer frame 201 (see FIGS. 8-10, and 20). In FIGS. 8-9, a portion of the spacer frame 201 on a front face 206 of the IGU 100 is omitted for clarity.

Figure 18:
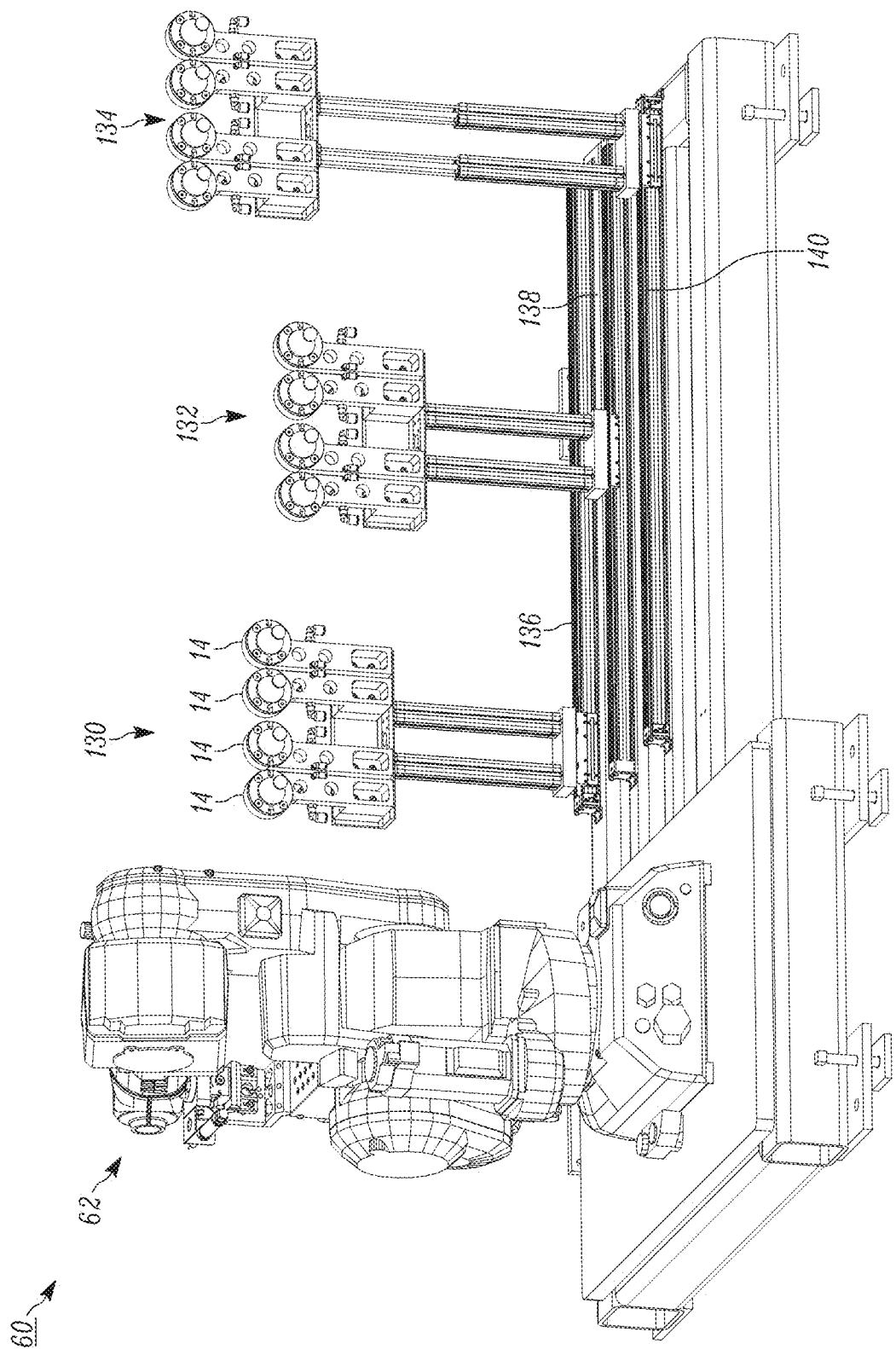
FIG. 18 is a rear perspective view of FIG. 17.
Figure 19:
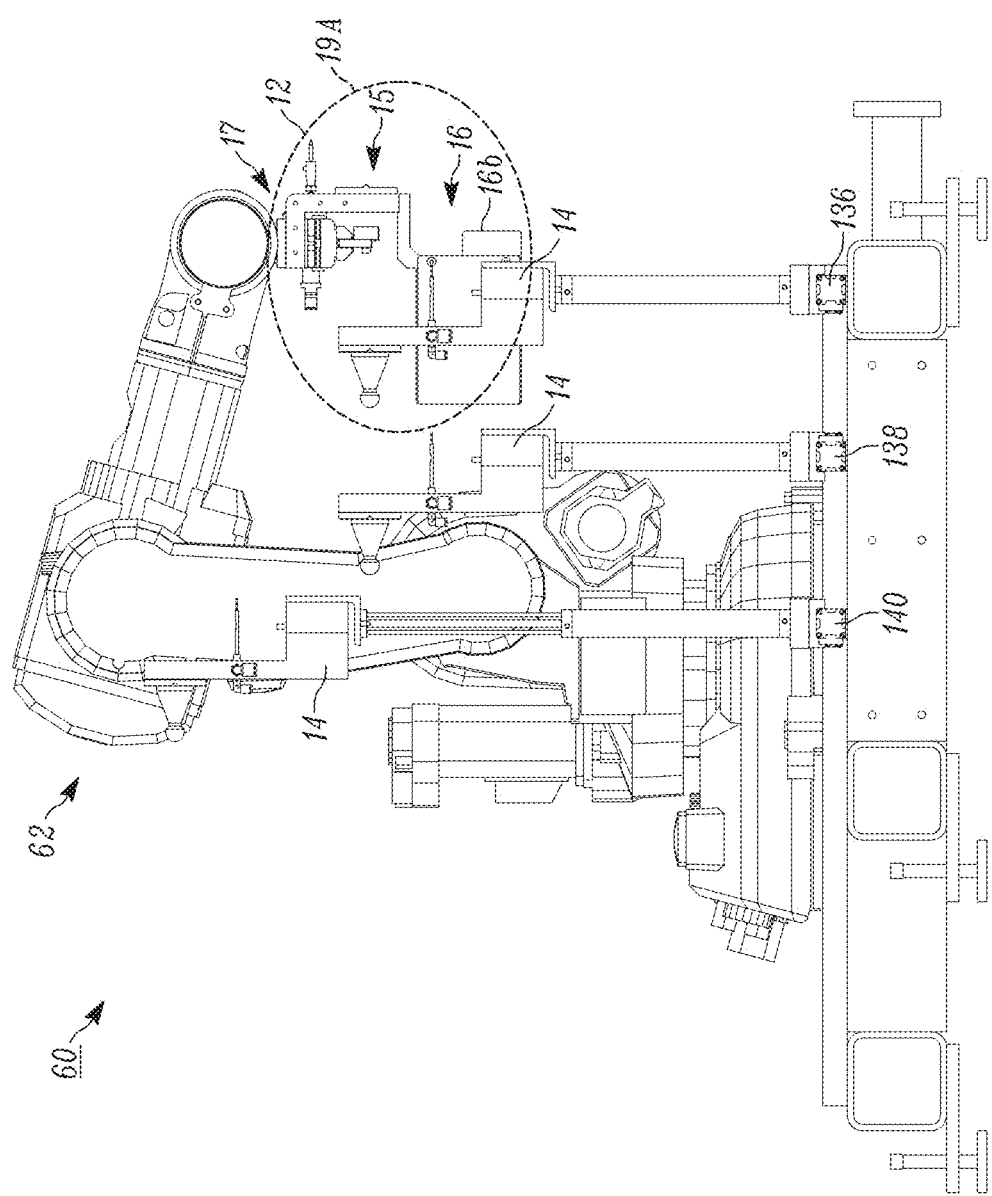
FIG. 19 is a right side elevation view of FIG. 17.

During assembly, applied sealant 200 cures around the spacer frame 201. An opening 203 through the spacer frame 201 is located in an uncovered area 209 (e.g., an area that lacks sealant 200) (see FIG. 10). Atmospheric air is evacuated while an inert gas is inserted into the space 207 within the IGU 100 (e.g., bounded by the spacer frame 201 and the glass lites 210, 212). The fluid exchanging system 10 includes a fluid exchanging station 60, comprising an articulating arm 62, an optical sensor system 16, and a fluid exchanging apparatus 14 in communication with a controller 35. The articulating arm 62 is coupled to an attachment apparatus 15, for selectively coupling the fluid exchanging apparatus 14 to the articulating arm, and an alignment apparatus 17 (see, for example, FIG. 4). Further, the fluid exchanging system 10 comprises one or more shuttles 130, 132, 134 that move along one or more tracks 136, 138, 140, the one or more shuttles holding one or more fluid exchanging apparatuses 14 (see, for example, FIGS. 17-19).

Figure 4:
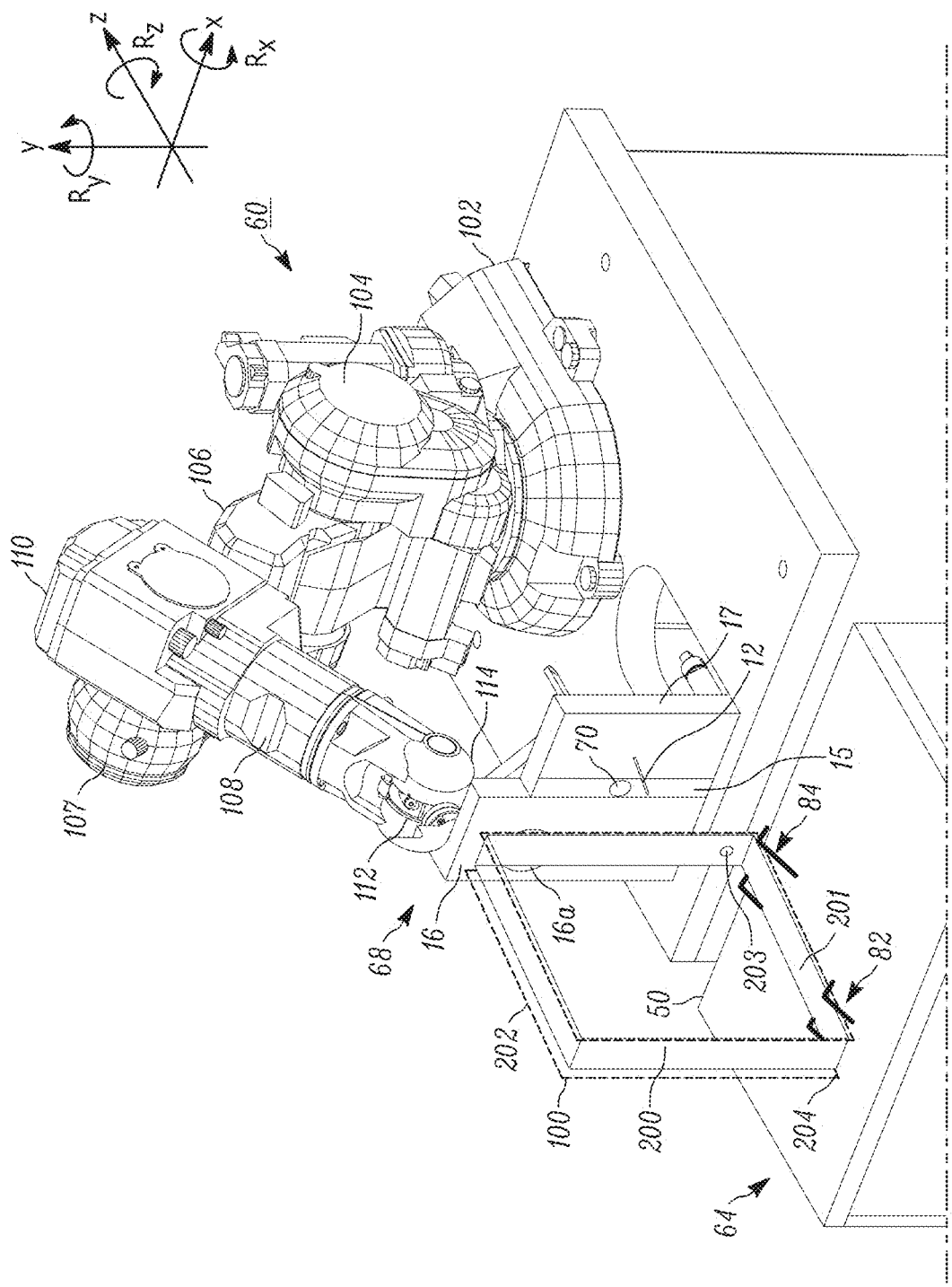
FIG. 4 is a perspective view of an optical sensor of the fluid filler station interacting with an insulating glass unit (IGU)

Typically, the optical sensor system 16, comprising an optical sensor 16a and a light source 16b (see FIGS. 15-20), is actuated (e.g., via the articulating arm 62) to move into various positions relative to different parts of an IGU 100 (see FIG. 4). In the illustrated embodiment, the optical sensor 16a identifies a portion of the IGU 100 that has a different optical property than the rest of the IGU (e.g., the opening 203 located in the uncovered area 209) and records the coordinates of said portion (e.g., the coordinate are stored by the controller 35). The coordinates identify a location in three-dimensional space that the controller 35 can find repeatedly when the IGU 100 is stationarily positioned in fixtures 82, 84 (see FIG. 4).

Figure 5:
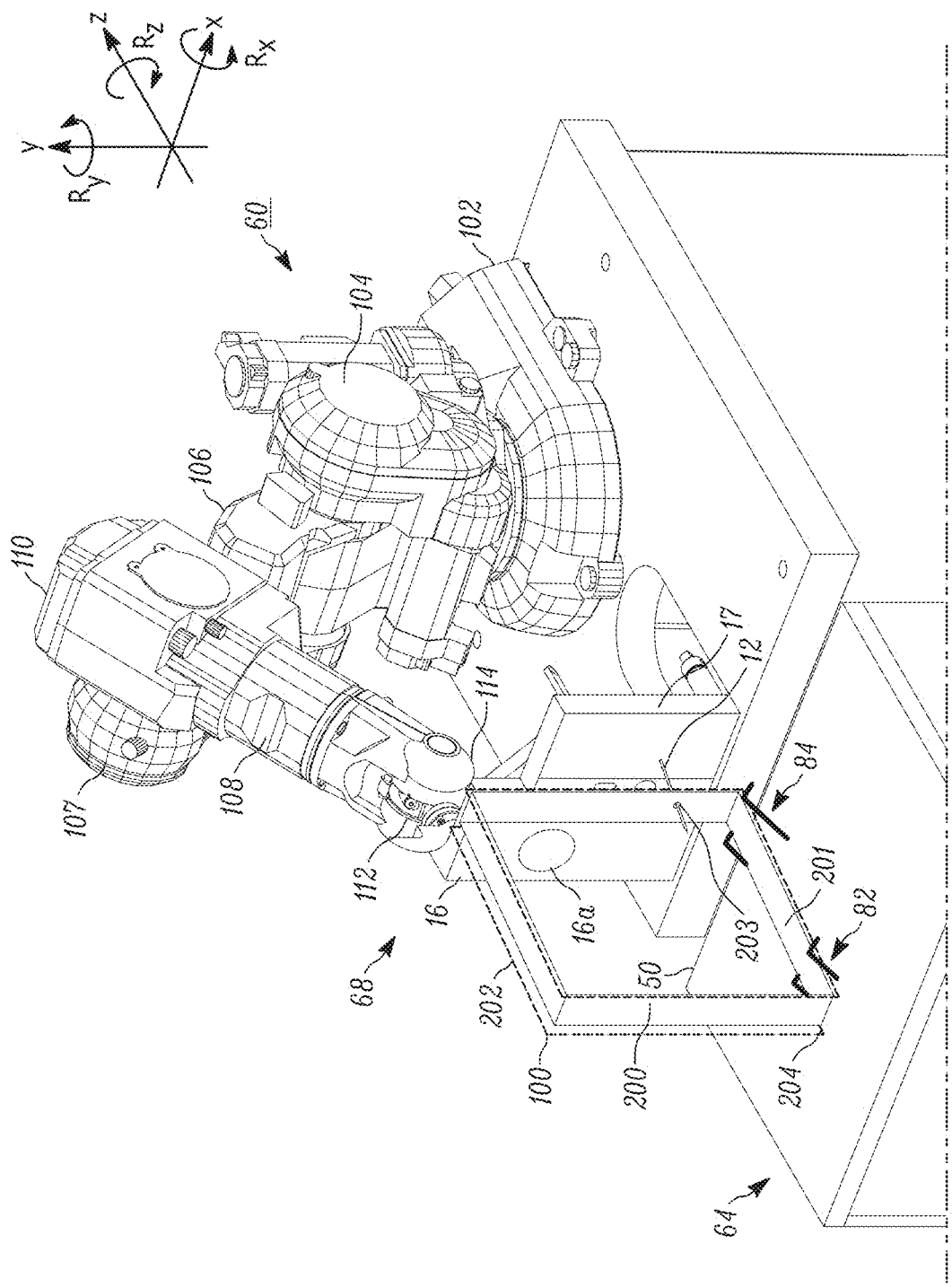
FIG. 5 is a perspective view of a probe of the fluid exchanging station interacting with an IGU.

As illustrated in FIG. 5, once the coordinates are identified, the alignment apparatus 17 is actuated (e.g., via the articulating arm 62) to the coordinates (e.g., responsive to instruction by the controller 35). The alignment apparatus 17 confirms the location of the opening 203, and that the opening is not obstructed by inserting a probe 12 into the opening. The probe 12 pushes through the opening 203 to ensure there are no obstructions, and to "open" the opening in the event that the two overlapping holes that form the opening are slightly misaligned. The probe 12 is mounted to a pneumatic cylinder (not shown), and when actuated pushes through the opening 203 in the IGU 100. If there is an excessive obstruction in the opening 203, then the cylinder will not fully extend, which will indicate to the controller 35 that this particular IGU 100 cannot be processed. Thus, the lites 210, 212 are prevented from being scratched, and a fluid exchanging head 13 (e.g., a needle like structure) is prevented from being bent or otherwise damaged through improper insertion, or attempted insertion into a blocked opening 203. In one example embodiment, the probe 12 comprises a proximity sensor in communication with the controller 35, such that the proximity sensor communicates the location of barriers (e.g., the glass lites 210, 212 internal surfaces) and obstacles (e.g., the spacer frame 201, the sealant 200, etc.) to the controller without actually touching said barriers or obstacles. The probe 12 has a diameter that is less than an opening diameter 203a of the opening (see FIG. 10). In one example embodiment, the probe 12 has a probe diameter of between 1 mm to about 6 mm and the opening diameter 203a is between 1.2 mm to about 6.2 mm. In another example embodiment, the probe 12 has a probe diameter of 3.8 mm and the opening diameter 203a is 4.0 mm. The probe 12 and/or the fluid exchanging head 13 comprise one of metal, plastic, or the like.

As illustrated in FIG. 9, once the coordinates and clearance of the opening are confirmed, the opening 203 is opened (e.g., if initially misaligned), and/or the lack of obstruction within the opening 203 is confirmed by the insertion of the probe 12, the attachment apparatus 15 is coupled to the fluid exchanging apparatus 14, and is actuated (e.g., via the articulating arm 62) to the confirmed coordinates (e.g., responsive to instruction by the controller 35). In one example embodiment, coordinates of one or more openings 203 of one or more IGUs 100 are identified, and probed by the probe 12, and then, one or more fluid exchanging apparatuses 14 are sequentially actuated (e.g., via the articulating arm 62) to the confirmed coordinates to evacuate/dispense into the one or more identified IGUs. Once coupled to the attachment apparatus 17 and actuated, the fluid exchanging head 13 of the fluid exchanging apparatus 14 is inserted into the opening 203 at the determined angle of insertion, wherein, the fluid exchanging head evacuates ambient air and dispenses a desired fluid (e.g., helium, neon, argon, krypton, xenon, or other like fluids). The fluid exchanging head 13 has a dispensing diameter 25 that is less than the opening diameter 203a (see FIGS. 10, 13A-13B). In one example embodiment, the dispensing diameter 25 is between 1 mm to about 6 mm and the opening diameter 203a is between 1.2 mm to about 6.2 mm. In another example embodiment, the dispensing diameter 25 is 3.8 mm and the opening diameter 203a is 4.0 mm. The fluid exchanging head 13 comprises one of metal, plastic, or the like.

Views of the fluid exchanging station 60 constructed in accordance with one example embodiment of the present disclosure are illustrated in FIGS. 2-5. The fluid exchanging station 60 comprises the articulating arm 62, a support stand 66, and a tool support assembly 68. The tool support assembly 68 includes the attachment apparatus 15 for selectable coupling to the fluid exchanging apparatus 14, the optical sensor system 16, and/or the alignment apparatus 17. The selectable couplable components are enabled and actuated by instructions from the controller 35 to translate and rotate into a position relative to selected portions (e.g., the opening 203) of the IGU 100. The controller 35 co-ordinates the operation of the fluid exchanging apparatus 14, the optical sensor system 16, the alignment apparatus 17, and various functions associated therewith.

In the illustrated example embodiment, the articulating arm 62 is a six-axis articulating arm, that is, the arm is capable of translation in the X, Y, and Z axial directions as well rotation about each axis Rx, Ry, Rz, as illustrated by the coordinate system illustrated in FIG. 4. The fluid exchanging station 60 includes a base 102, a first member 104, a first arm 106, a second member 107, a second arm 108, and a third member 112. The base 102 rotates about the Y axis, thus rotating the first member 104, first arm 106, second member 107, second arm 108, third member 112, and tool support assembly 68. The first member 104 rotates about the X axis, thus rotating the first arm 106, second member 107, second arm 108, third member 112, and tool support assembly 68. The second member 107 rotates about the X axis, thus rotating the second arm 108, third member 112, and tool support assembly 68. The third member 112 rotates about the X axis, thus rotating the tool support assembly 68.

Secured to the third member 112 is a coupling 114 that is mechanically attachable to the tool support assembly 68. The arm 62 rotates about the Y axis, thus rotating the coupling 114 and tool support assembly 68. Each of the selectable couplable components 12, 14, 16 can be oriented to rotate about the Z axis when needed. In one example embodiment, the articulating arm is a six-axis arm manufactured by ABB of Zurich, Switzerland sold under part number ABB-IRB140, the datasheet being incorporated herein by reference.

In the illustrated example embodiment, areas with differing topography, especially the opening 203 of the IGU 100 placed at the fluid exchanging station 60 are identified by the optical sensor system 16. In one example embodiment, the optical sensor system 16 includes a laser, which scans along a line of the IGU 100 profile (see FIG. 4) or a camera based optical sensor that images an entire region of the spacer frame 201. Other alternate embodiments utilize tactile or touch sensors for determining the spacer frame profile (e.g., identifying the opening 203). In the illustrated example embodiment, the optical sensor system 16 identifies areas of the IGU 100 comprising the opening 203. The profiling of the IGU 100 by the optical sensor system 16, in one example embodiment, occurs when the IGU is supported in a frame securing assembly 64. It would be appreciated by one having ordinary skill in the art that the frame securing assembly 64 may secure multiple IGUs (see, for example, FIG. 20). Further, it would be appreciated that the frame securing assembly 64 may be stationary or mobile. When mobile the frame securing assembly 64 can be controlled by the controller 35, to move between various IGU assembly stations, thereby tracking the location of the respective openings 203 as the IGU assemblies move.

Figure 7:
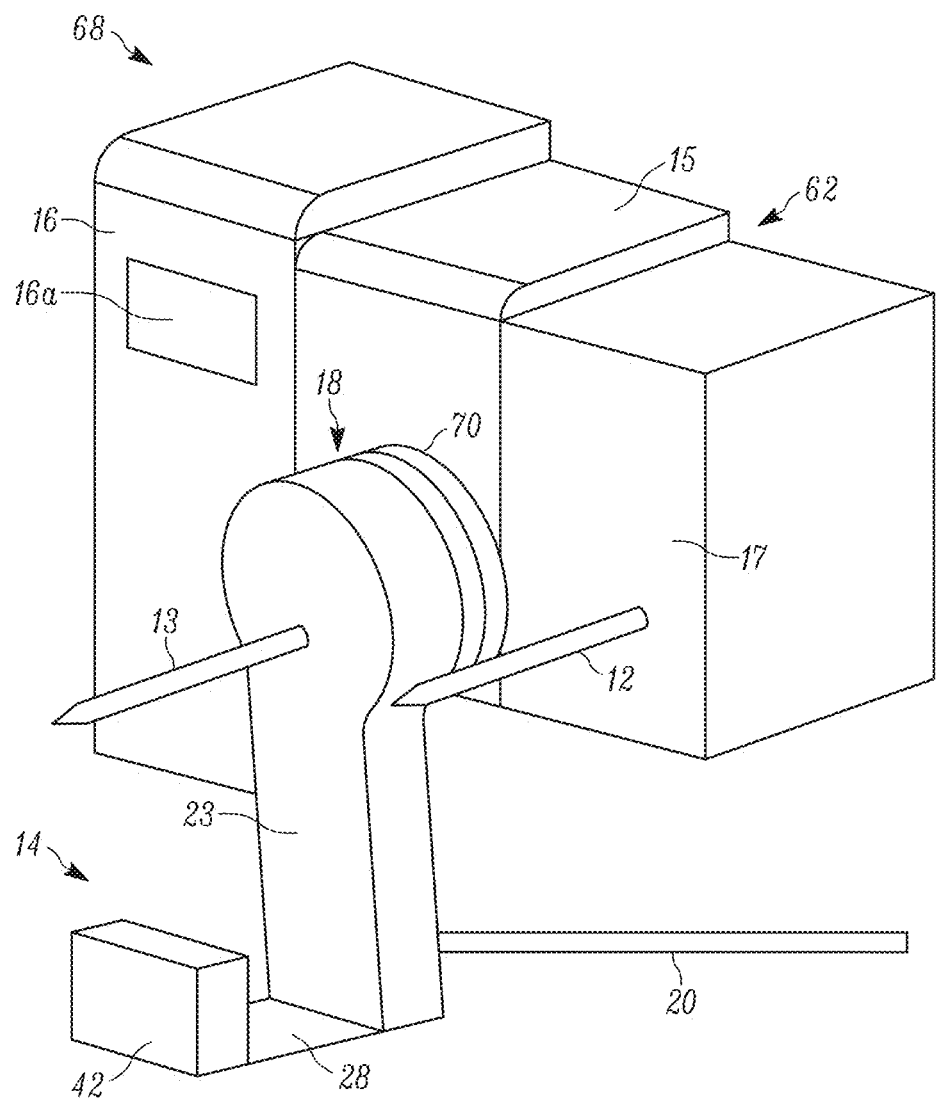
FIG. 7 is a front perspective view of a fluid exchanging apparatus and optical sensor system coupled to the fluid exchanging station of FIG. 2
Figure 19A:
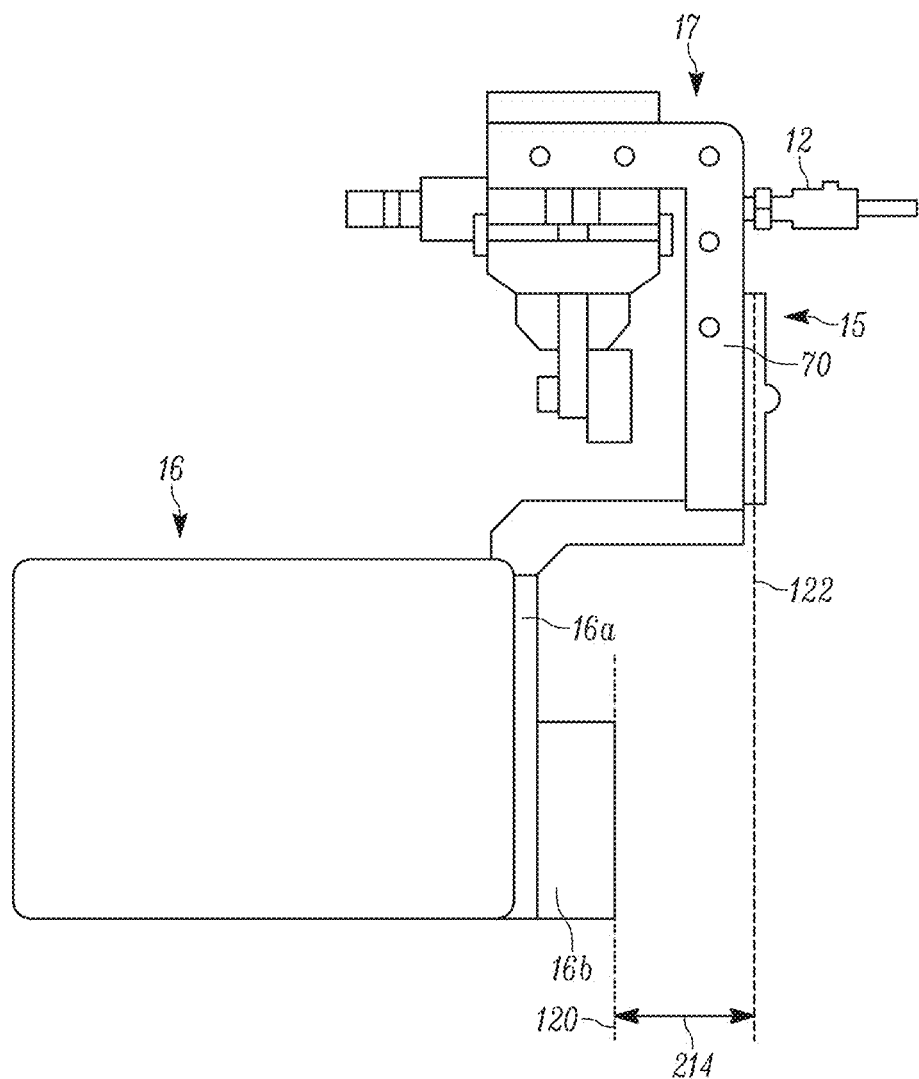
FIG. 19A is a magnified view of the section 19A of FIG. 19.

In the illustrated example embodiment of FIGS. 7-9, the optical sensor system 16 is laterally adjacent the attachment apparatus 15, wherein the attachment apparatus laterally spaces the optical sensor system from the alignment apparatus 17. In another illustrated example embodiment, such as in FIGS. 15-16, and 19A, the optical sensor system 16 is longitudinally adjacent and coupled to the attachment apparatus 15. In this embodiment, an optical sensor plane 120, on which a most protruding portion (e.g., toward a front face of the attachment apparatus 15) of the optical sensor system 16 resides, is an optical distance 124 behind an attachment plane on which the front face of the attachment apparatus is located (see FIG. 19A). The optical distance 124 is between about 5 cm to about 7 cm. The optical sensor system 16 being longitudinally adjacent and recessed relative to the attachment apparatus 15 prevents damage to the optical sensor system. In this example embodiment, the optical sensor system 16 comprises a light source 16b. The light source 16b is manufactured by Banner Engineering under part number WL50-2Q with a translucent filter.

Figure 12:
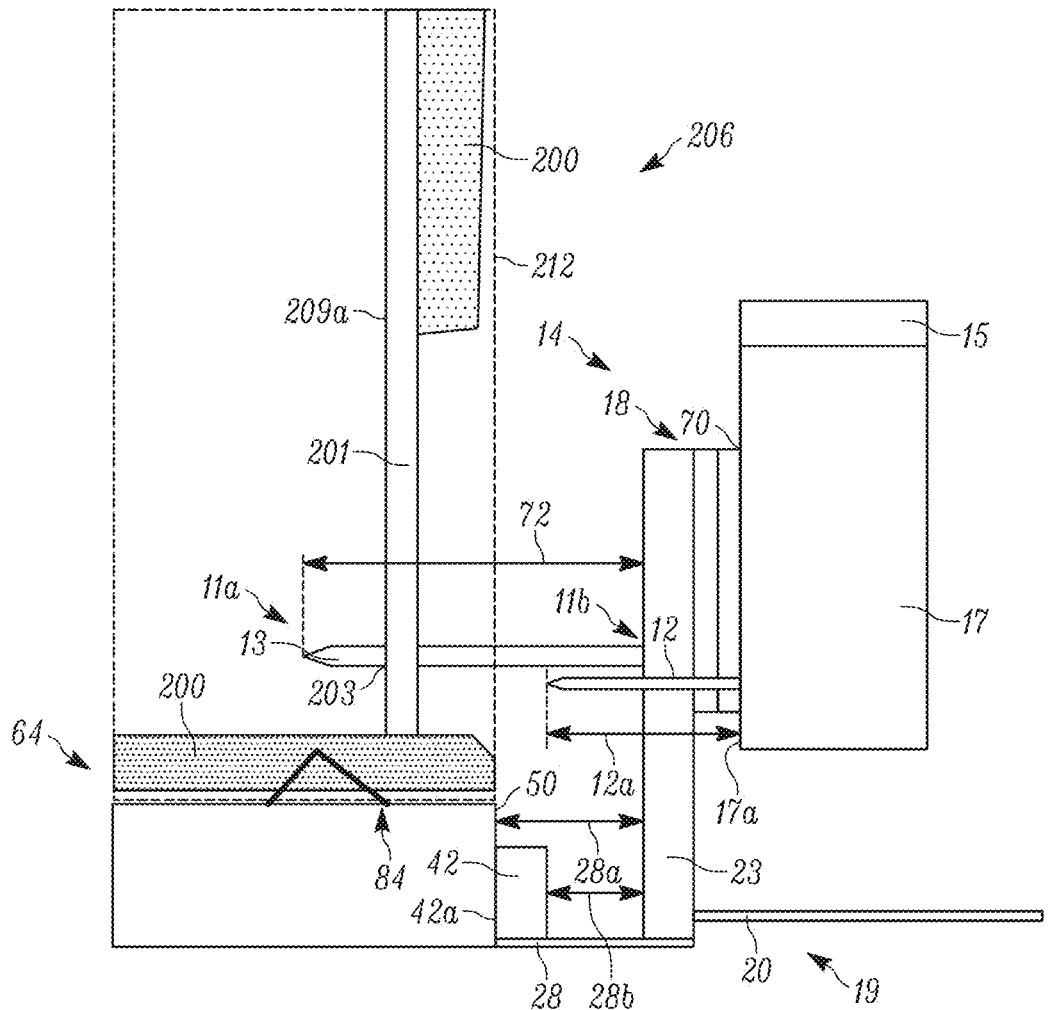
FIG. 12 is a section view of FIG. 9 taken along section lines 12-12.

Referring to FIGS. 4-5, and 12, the frame securing assembly 64 includes a number of clamps and corresponding pins 82, 84 for fixing an IGU 100 in place. For example, the frame securing assembly 64 has fixed clamps or fencing 82 and 84 that contact an outer surface of the IGU 100 in a region of one or more corners of the IGU. The frame securing assembly 64 comprises a front surface 50, made of a metallic material (e.g., comprising iron, nickel, cobalt, or the like). In one example embodiment, the front surface 50 is magnetized having a first polarity. The IGU 100 has top and bottom surfaces 202, 204, respectively that are oriented within the frame securing assembly 64 in a generally vertical plane with respect to a shop floor (see FIGS. 4, 5, and 14). In an example embodiment, the IGUs 100 will be positioned such that the face of the IGU comprising the opening 203 faces the articulating arm 62. Further details of the fixed clamps 82 and 84 and their operation is found in U.S. Pat. Nos. 8,250,023 and 7,921,064, which are assigned to the assignee of the present disclosure and both patents are incorporated herein by reference in their entireties. The fixed clamps 82, 84 maintain the IGUs 100 in a perpendicular orientation relative to the front face 50 of the frame securing assembly 64.

Figure 6:
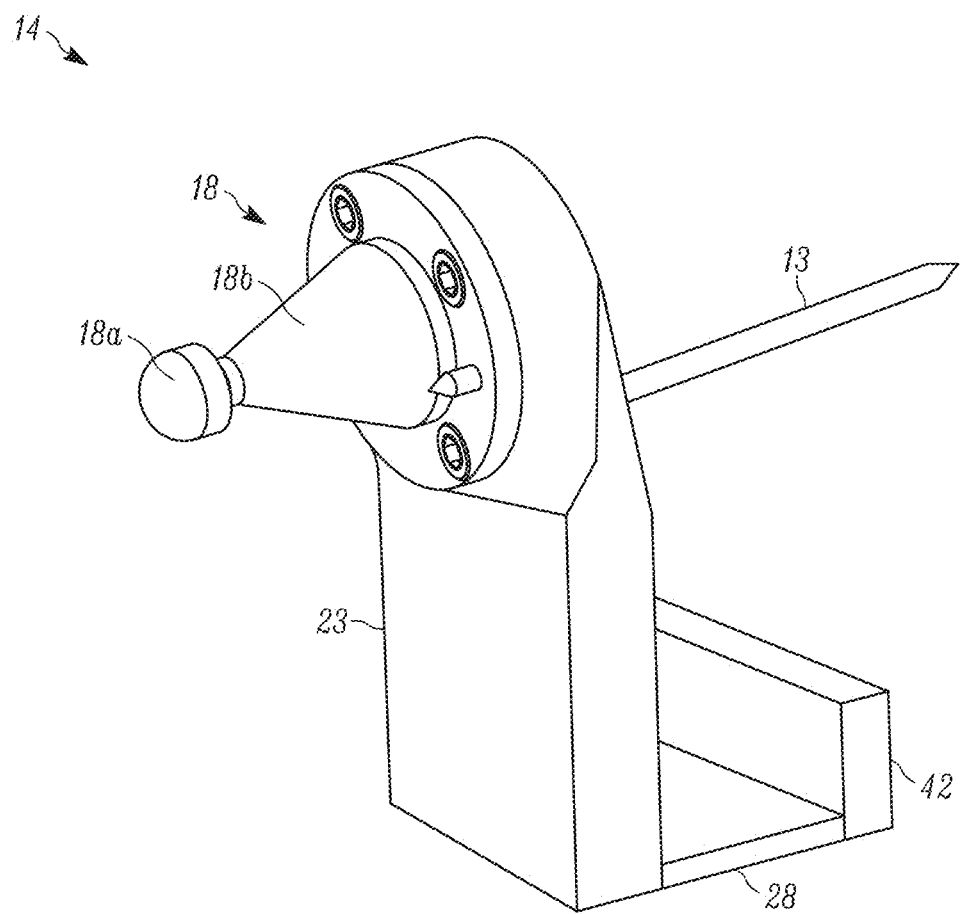
FIG. 6 is a rear perspective view of a fluid exchanging apparatus that is couplable to the fluid exchanging station of FIG. 2.
Figure 12A:
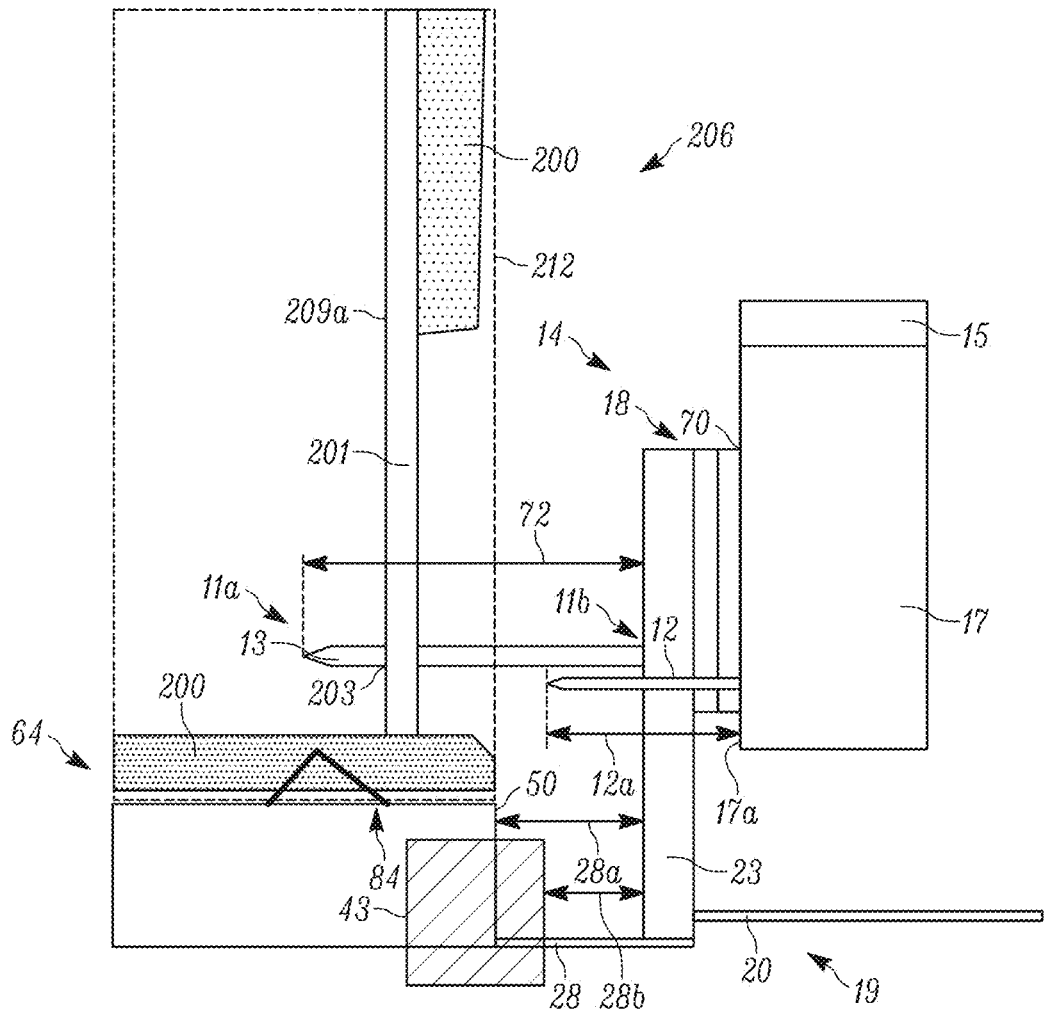
FIG. 12A is a section view of FIG. 9 taken along section lines 12-12 showing a clamp embodiment.

Referring to FIGS. 6-7, the fluid exchanging apparatus 14 comprises a tool connector 18, the fluid exchanging head 13 for evacuating atmospheric air and dispensing fluid into the IGU 100, a fluid input 20 connecting the fluid exchanging head to a fluid reservoir (not shown) and/or a vacuum (not shown), and a support magnet 42 and/or support clamp 43 (see FIG. 12A) coupled to the fluid exchanging apparatus via a support portion 28.

Referring to FIGS. 6, and 7, the tool connector 18 of the fluid exchanging apparatus 14 is configured to be releasably coupled to the articulating arm 62 via a tool support arrangement 70 of the attachment apparatus 15. The tool connector 18 comprises a cone shaped portion 18*b* abutting a nose portion 18*a*. The tool support arrangement 70 interacts with at least one of the nose portion 18*a* and the cone shaped portion 18*b* to secure the fluid exchanging apparatus 14, such that the fluid exchanging apparatus is controlled in three dimensional space by the articulating arm 62 until the fluid exchanging apparatus is uncoupled from the articulating arm.

The fluid exchanging apparatus 14 has a home location (e.g., on the one or more shuttles 130, 132, 134, see FIGS. 17-19) and a dispensing location 19 (see, for example, FIGS. 13 and 20) both having coordinates known by the controller 35. The home location comprises one or more racks or holders 130, 132, 134 on which the fluid exchanging apparatus 14 rests. As shown in the illustrated example embodiments of FIGS. 13 and 20, the dispensing location 19 comprises a location wherein the fluid exchanging head 13 is inside the IGU, which is described in detail below.

Figure 13:
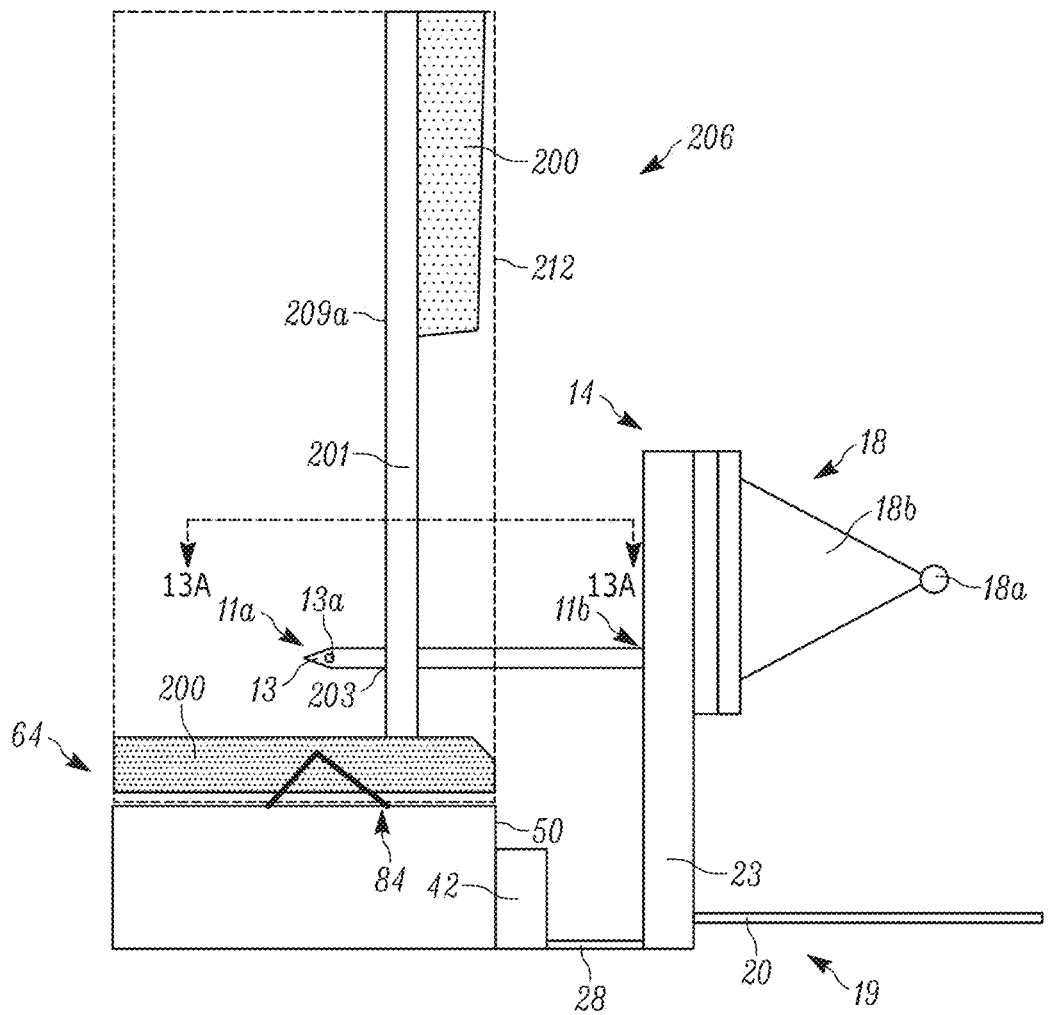
FIG. 13 is a section view of FIG. 9 taken along section lines 12-12, wherein the fluid exchanging apparatus is uncoupled from the fluid exchanging station.
Figure 14:
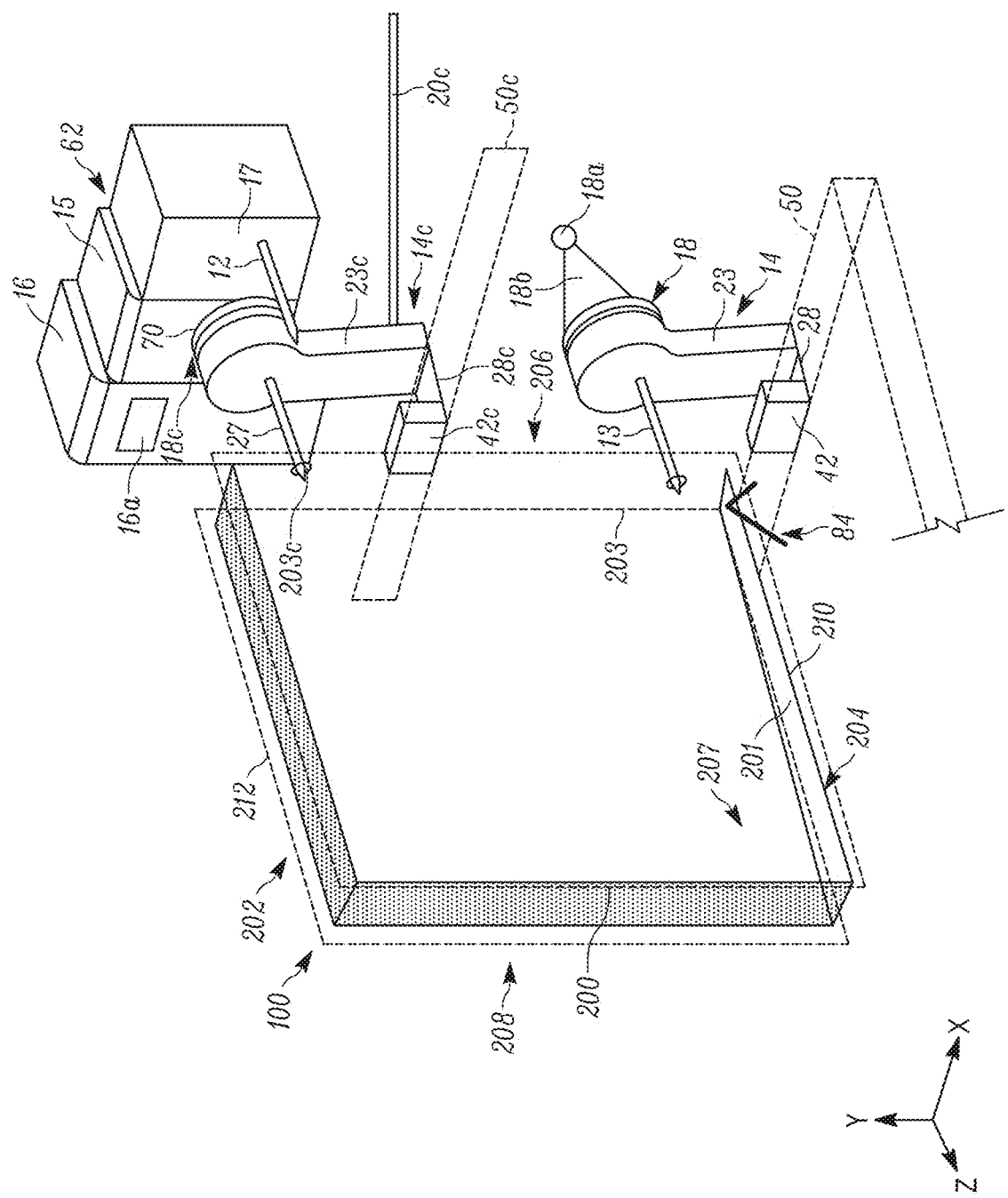
FIG. 14 is a simplified front perspective view of a fluid exchanging apparatus, and a second fluid exchanging apparatus coupled to an optical sensor system and the fluid exchanging station interacting with an IGU.
Figure 15:
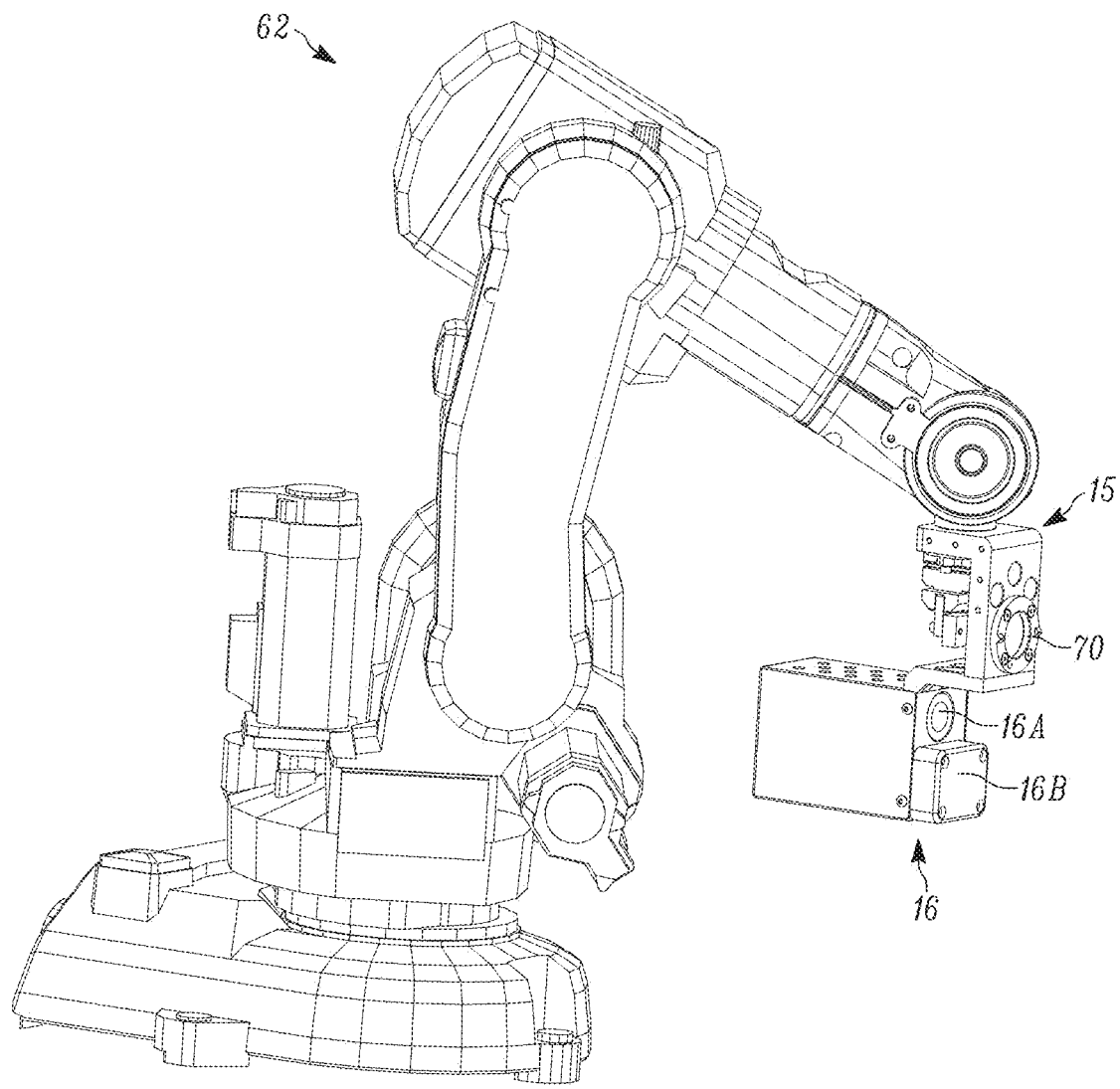
FIG. 15 is a right side perspective view of a fluid exchanging station in accordance with a second example embodiment of the present disclosure.
Figure 16:
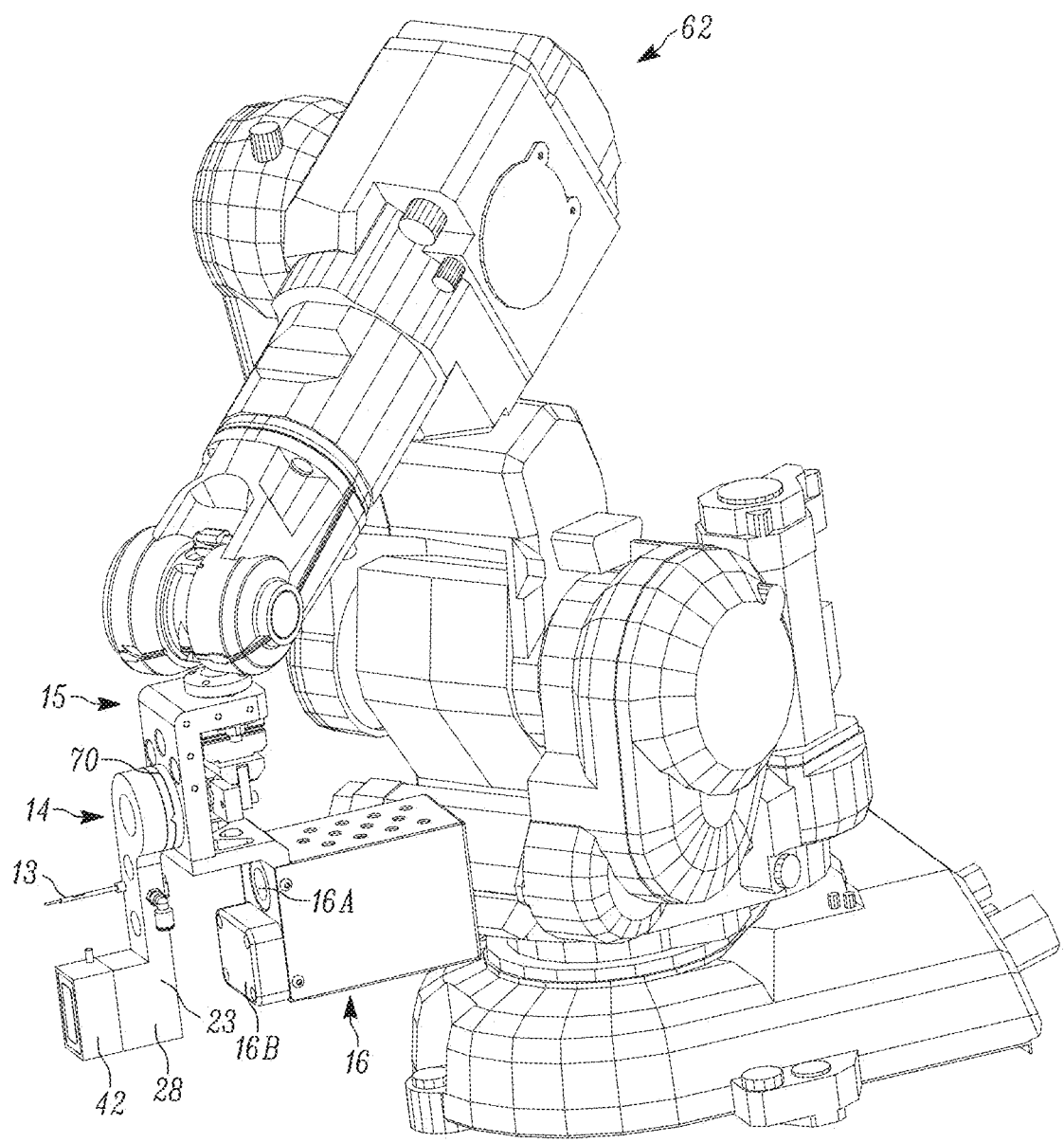
FIG. 16 is a left side perspective view of FIG. 15 wherein a fluid exchanging apparatus is coupled to the fluid exchanging station.
Figure 20:
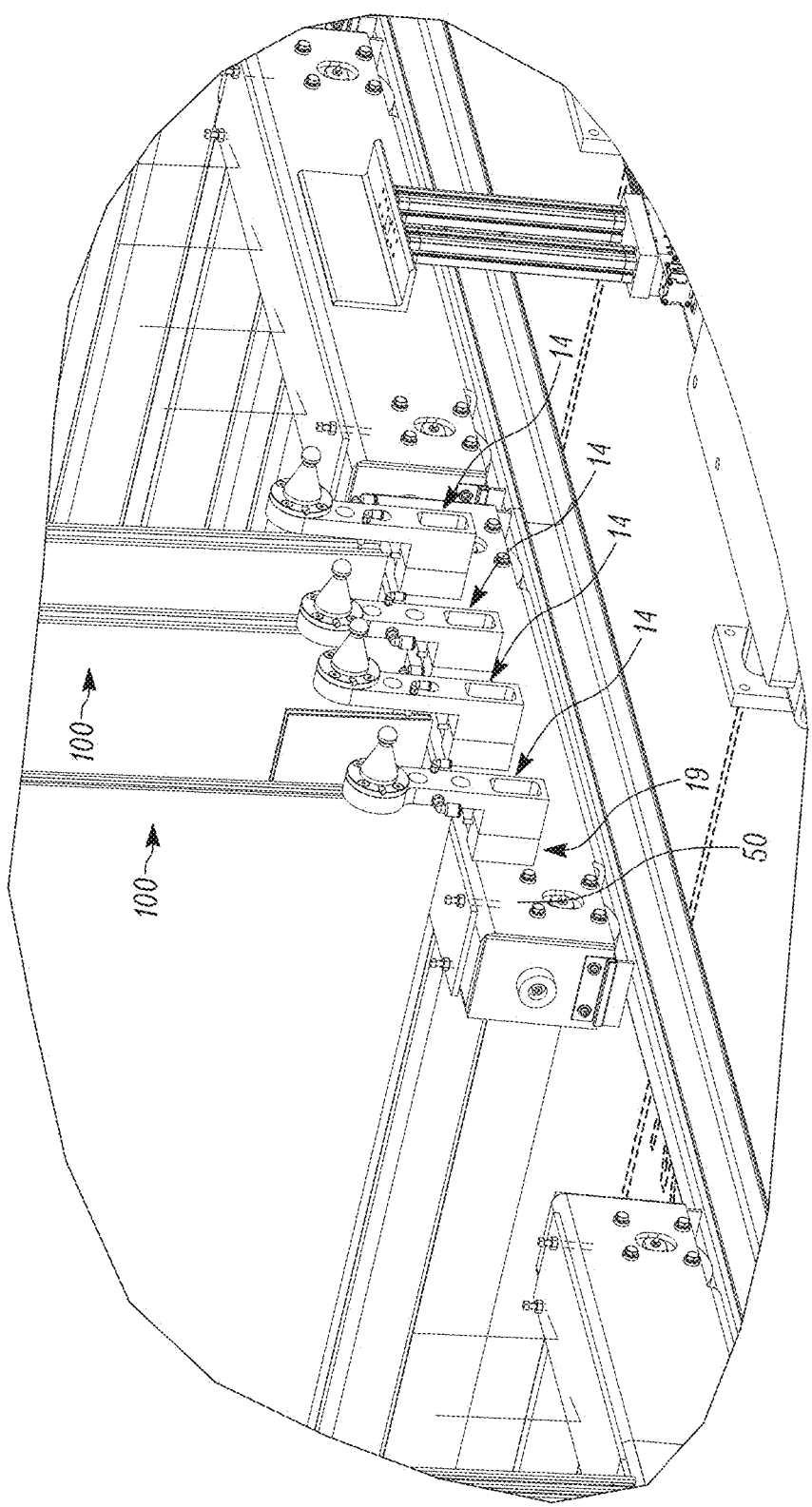
FIG. 20 is a rear perspective view of multiple fluid exchanging apparatuses interacting with an IGU.

Referring to FIGS. 5-7, 9, 12-13, and 20, responsive to the attachment apparatus 15 coupling to the fluid exchanging apparatus 14, the fluid exchanging head 13 is aligned with the opening 203, and inserted into the IGU 100. The IGU 100 is supported on the frame securing assembly 64 such that when the fluid exchanging head 13 is inserted into the IGU, the support magnet 42 or support clamp 43 engages with the front surface 50 of the frame securing assembly. The support magnet 42 comprises a second polarity, the second polarity opposite the first polarity of the front surface 50. The support magnet 42 (having a pull force of approximately 200 lbs. against steel) has a flux density over a threshold, wherein the flux density is sufficient to support the fluid exchanging apparatus 14 in a constant position in 3 dimensional space. Stated another way, responsive to the support magnet 42 engaging the front surface 50, the attachment apparatus 15 can release the fluid exchanging apparatus 14, and the fluid exchanging apparatus will remain engaged with the front surface, as illustrated in FIGS. 13-14, and 20. In another example embodiment, the support clamp 43 comprises a solenoid powered clamp, a friction powered clamp, a clamp that interacts with a slot, or spring loaded attached mechanism located on or near the front surface 50. As the articulating arm 62 is instructed to insert the fluid exchanging head 13 into the opening 203, the support magnet 42 or support clamp 43 engages the front surface 50 after the fluid exchanging head 13 has entered the IGU 100. In another example embodiment, the support clamp 43 frictionally or physically secures the fluid exchanging apparatus to the front surface 50 and/or the frame securing assembly 64. Thus, the fluid exchanging head 14 is secured at the dispensing location 19 (see FIGS. 13-14, and 20).

The articulating arm 62 couples to the fluid exchanging apparatus 14, when it is located on the one or more shuttles 130, 132, 134, for movement to the dispensing location 19. The dispensing location 19 is determined relative to the location of the IGU 100 and the frame securing assembly 64. The articulating arm 62 then uncouples from the fluid exchanging apparatus 14 at the dispensing location 19 before or after atmospheric air begins being evacuated and the fluid has begun being dispensed.

Once a desired amount of fluid has been dispensed into the IGU 100, the articulating arm 62 re-couples to the fluid exchanging apparatus 14. The articulating arm 62 then removes the fluid exchanging apparatus 14 from the dispensing location 19 and moves it to the one or more shuttles 130, 132, 134. When the fluid is being dispensed, a fluid valve of the fluid reservoir is open to allow the fluid from the fluid input 20 to flow through fluid exchanging head 13, for example, when the fluid reservoir is under pressure. Once the internal volume of the IGU 100 reaches a desired pressure of the fluid, the fluid valve is closed stopping fluid from going from the reservoir to the fluid exchanging head 13. It would be appreciated by one having ordinary skill in the art that the fluid may be under pressure, or may be attached to a pump to cause the fluid to flow from the reservoir to the fluid exchanging head 13.

As illustrated in FIGS. 13, and 13A-13B, the fluid exchanging head 13 comprises an exchanging opening 13*a* at a leading end 11*a* of the dispensing head and is connected to a head support 23 of the fluid exchanging apparatus 14 at a trailing end 11*b*. A first example embodiment of the dispensing head 13, as illustrated in FIG. 13A, comprises two independent flow paths, a vacuum path 9 and a fluid dispensing path 7. The vacuum path 9 connects the vacuum to a vacuum opening 13*b*, such that atmospheric air is extracted along the direction indicated by arrows 9*a* out of the IGU 100. The fluid dispensing path 7 connects to the fluid reservoir to the exchanging opening 13*a*, such that fluid is input along the direction indicated by arrows 7*a* into the IGU 100. It would be appreciated by one having ordinary skill in the art that multiple dispensing/vacuum openings in multiple configurations on the fluid exchanging head are contemplated.

A second example embodiment of the dispensing head 13 is illustrated in FIGS. 13B-13C, and 14, the dispensing head comprises a single flow path connected to the vacuum. The second embodiment is typically employed when a higher priced fluid is being utilized to fill the IGU 100. In the second embodiment, the IGU 100 comprises a second opening 203*c*, substantially identical to the opening 203. The second opening 203*c* is located in an opposite corner from the opening 203, either as illustrated in FIG. 14, where the two openings are on the front face 206 of the IGU 100, or where the second opening is located on a rear face 208 of the IGU.

As illustrated in FIGS. 13 and 14, the fluid exchanging apparatus 14 is coupled to the front face 50 of the frame securing assembly 64, and uncoupled from the articulating arm 62. Coordinates of the second opening 203c are identified by the optical sensor apparatus 16, and the alignment/clearance of the opening is confirmed by the probe 12. A second fluid exchanging apparatus 14c being substantially the same as the fluid exchanging apparatus 14, wherein like figures are represented by the same number followed by a c, except the second fluid exchanging head is relabeled 27, is coupled to the articulating arm 62. The second fluid exchanging head 27 is inserted into the second opening 203c. In one example embodiment, the articulating arm 62 maintains the position of the second fluid exchanging apparatus 14c during the fluid exchanging and evacuation. In another example embodiment, a second front surface 50c, which is parallel to and comprises a substantially same composition and function as the front surface 50, is manually or automatically (e.g., by the controller 35) vertically adjustable and is attached to the frame securing assembly 64. The second front surface 50c is adjusted (e.g., to account for differently sized IGUs) such that when the second support magnet 42c is in contact with the second front surface, the second fluid exchanging head 27 is aligned with the second opening 203c. In this embodiment, the second fluid exchanging apparatus 14c is coupled to the second front surface 50c and the articulating arm 62 uncouples from the second fluid exchanging apparatus 14c during dispensing and/or evacuating.

Once the fluid exchanging head 13 and the second fluid exchanging head 27 are inserted into the IGU 100, the fluid exchanging head 13, responsive to being connected to the vacuum, evacuates atmospheric air along the direction indicated by the arrows 9a out of the IGU 100 and the second dispensing head 27 connected to the reservoir simultaneously dispenses the fluid along the direction indicated by the arrows 7a into the IGU 100 via the second opening 203c. It would be appreciated by one having ordinary skill in the art that the second dispensing head 27 could be connected to the vacuum and the dispensing head 13 could be connected to the reservoir. It would likewise be appreciated by one having ordinary skill in the art that responsive to the second opening being on the rear face 208 of the IGU 100, a second fluid exchanging system may be located on the rear face, and function in a same or similar manner as the fluid exchanging system 10 on the front face 206.

In one example embodiment, the fluid exchanging head 13 comprises a pressure gauge in communication with the controller 35. The pressure gauge monitors the pressure inside the IGU 100 (e.g., determines that the atmospheric air having been evacuated is replaced by the fluid to prevent a pressure imbalance between the inside of the IGU and the outside of the IGU). To maintain a balanced pressure between the inside of the IGU 100 and the outside of the IGU, the controller 35 will instruct the vacuum to stop suction, increase suction, or remain at a current suction and/or increase, decrease, or keep constant a dispensing flow speed of the dispensing fluid. The vacuum and the dispenser functions happen concurrently. Responsive to the pressure gauge indicating that the desired pressure of the fluid inside the IGU 100 has been reached, the controller 35 will instruct the fluid valve to close, ceasing fluid dispensing. In one example embodiment, responsive to a sensor in the vacuum indicating that the vacuum is evacuating the fluid, over a fluid threshold (e.g., 90% fluid), the controller 35 will instruct the vacuum to stop suction and the fluid valve to close, ceasing fluid dispensing. In another example embodiment, a pump or gauge within the fluid input 20 or reservoir will communicate the flow rate of the fluid to the controller 35, the vacuum will communicate an evacuation rate to the controller, and the controller will evacuate atmospheric air and dispense fluid for a predetermined time (e.g., such as when the volume inside the IGU 100 is known).

As illustrated in FIG. 12, the fluid exchanging head 13 comprises a first length 72 measured from the leading end 11a to the trailing end 11b. The magnetic extension 28 comprises a second length 28b between the head support 23 and support magnet 42. The first length 72 is greater than the second length 28b (e.g., the first length is at least 3 times the second length). In one example embodiment, the first length 72 is configured such that the exchanging opening 13a will extend into an IGU when the support magnet 42 is secured to the front surface 50. Additionally, as illustrated in FIG. 12, the probe 12 extends a probe length 12a from a front face 17a of the alignment apparatus 17. The probe length 12a is less than an attachment distance 28a between the front face 17a of the alignment apparatus 17 to a front face 42a of the support magnet 42. Thus preventing the probe 12 from interacting with IGU 100 when the fluid exchanging apparatus 14 is in the dispensing location 19.

While the fluid exchanging apparatus 14 is secured to the front surface 50 and evacuating air/dispensing fluid into the IGU 100, the articulating arm 62 is free to perform other functions. In one example embodiment, the articulating arm 62, after uncoupling from the secured and evacuating/dispensing fluid exchanging apparatus 14, identifies a second opening of a second IGU using the optical sensor apparatus 16, and confirms the clearance and the location of the second opening. The articulating arm 62 then couples to a second fluid exchanging apparatus (e.g., identical to the fluid exchanging apparatus 14), and inserts a second dispensing head into the second opening of the second IGU 100. As illustrated in FIG. 20, multiple IGUs 100 can be simultaneously filled by multiple fluid exchanging heads 14. As evacuating atmospheric gas and dispensing fluid into IGUs is a slower process, relative to other IGU assembly processes, having multiple fluid exchanging heads concurrently evacuating atmospheric air/dispensing fluid into multiple IGUs will significantly increase the IGU assembly process speed.

Figure 11:
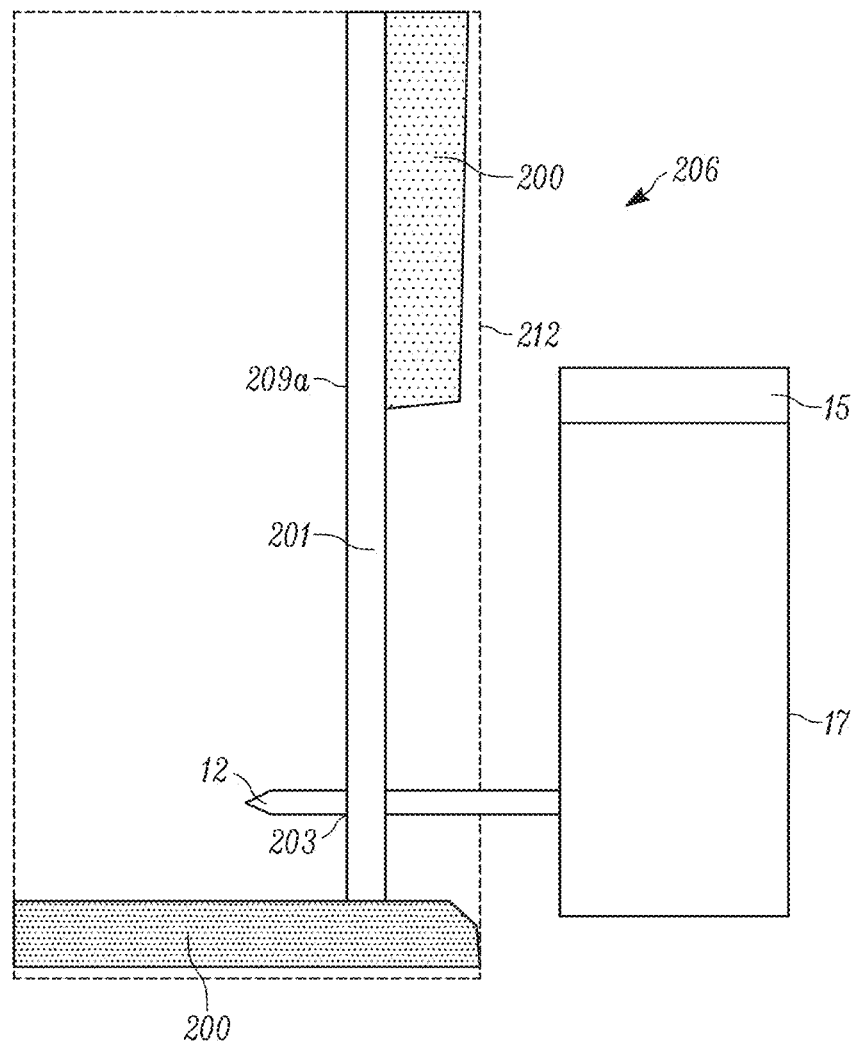
FIG. 11 is a section view of FIG. 8 taken along section lines 11-11.
Figure 21:
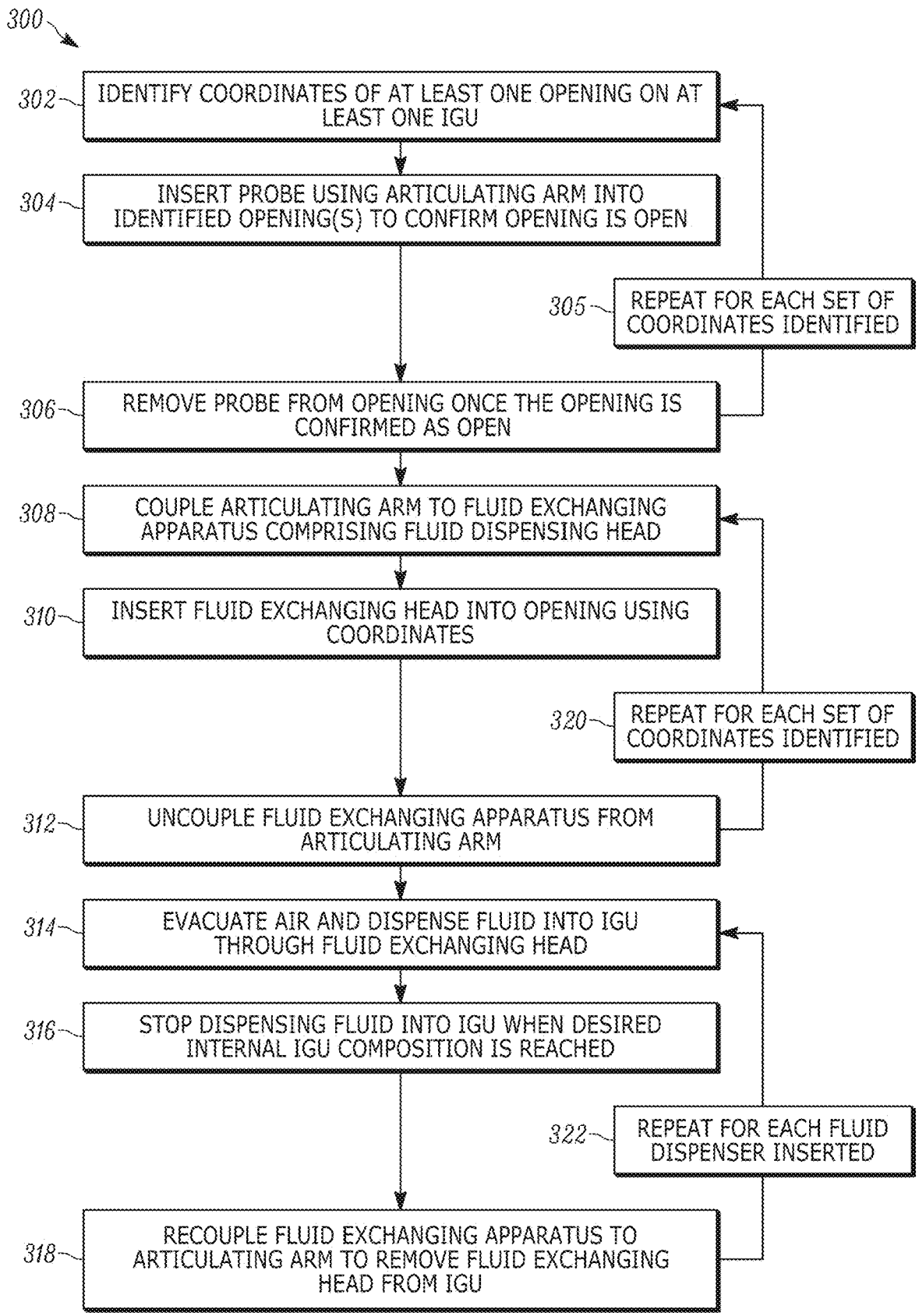
FIG. 21 is a flow diagram of a method of fluid dispensing.

During use, and as illustrated in the example method 300 of FIG. 21, at 302, the coordinates of at least one opening 203 in at least one of IGU 100 is determined by the optical sensor 16, and communicated to the controller 35. At 304, the articulating arm 62, coupled to the alignment apparatus 17, which comprises the probe 12, inserts said probe into the at least one opening 203 to confirm that at least one opening is not blocked, and/or misaligned and confirm the coordinates determined by the optical sensor 16 (see FIG. 11). At 306, the articulating arm 62 removes the probe 12 from the respective at least one opening 203. At 305, an optional step of repeating 302, 304, and 306 for the coordinates of the least one opening that are identified and probing the additional openings in additional IGUs to confirm that the additional opening are not blocked, and/or misaligned and confirm the coordinates determined by the optical sensor 16. In one example embodiment, the coordinates of openings will be identified, and probed by the probe 12 in sets of four. For example, four openings will be identified by the optical sensor system 16, and the probe 12 will be inserted into each of the identified openings, with the controller 35 learning the coordinates of each opening, and the status (e.g., blocked, free of obstruction, etc.) of said openings. In a first embodiment, the coordinates of a first opening will be identified, and then the probe 12 will be inserted into the first opening, then a second opening will be identified, the probe will then be inserted into the second opening, and this pattern will be repeated for a pre-determined number of openings (e.g., for four openings). In a second embodiment, coordinates of the pre-determined number of openings will be identified, and then will be sequentially probed by the probe 12. A person having ordinary skill in the art would appreciate that any variation of the above patterns has been considered.

Figure 17:
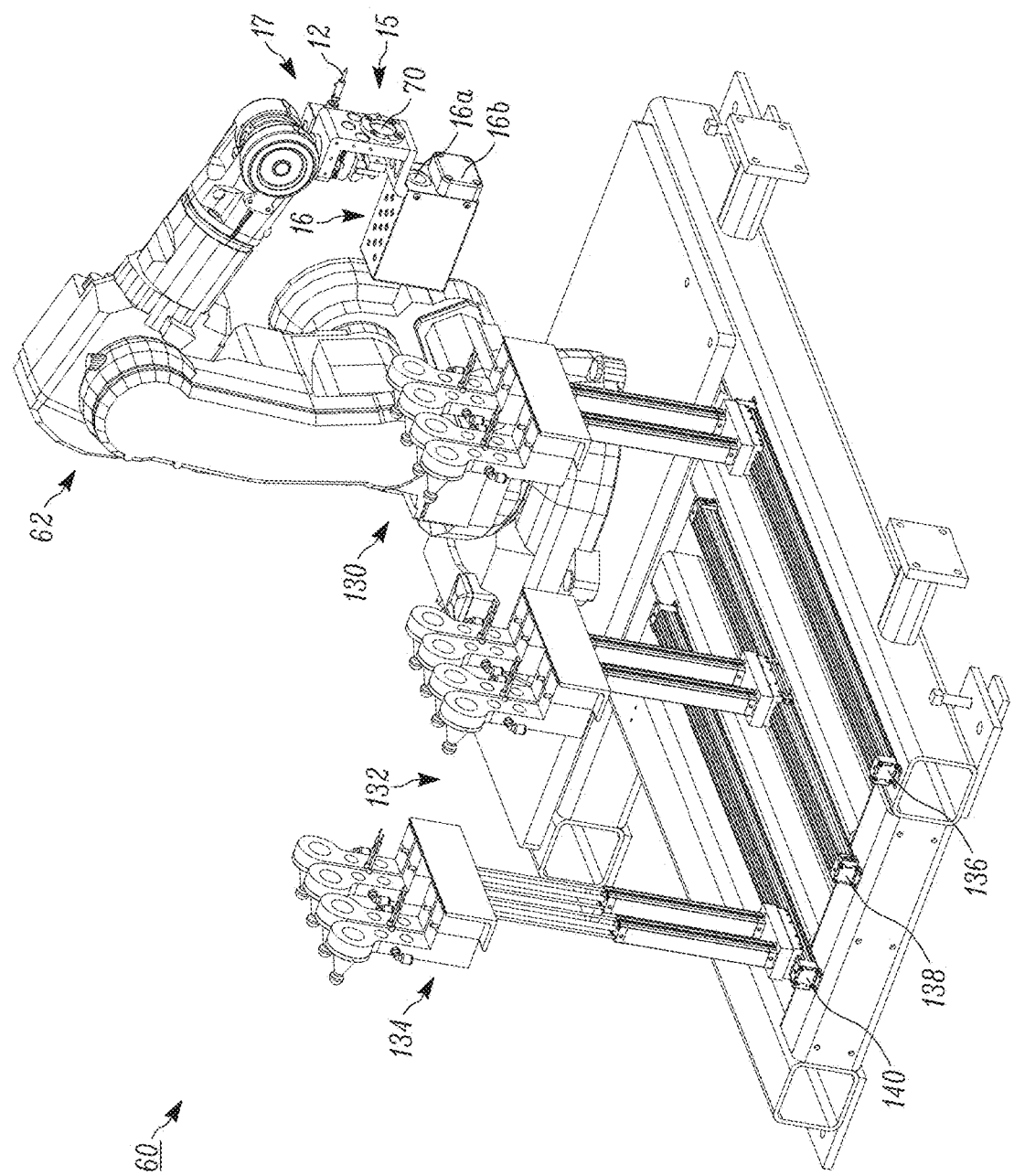
FIG. 17 is a right side perspective view of a fluid exchanging system in accordance with a second example embodiment of the present disclosure.

At 308, the articulating arm 62 couples to the fluid exchanging apparatus 14, to couple the fluid exchanging head 13 to the arm. In this example embodiment, the fluid exchanging apparatus 14 is located on a first shuttle 130, which is located nearest the articulating arm 62, as illustrated in FIG. 17. The first shuttle 130, a second shuttle 132, and a third shuttle 134 are coupled to parallel tracks 136, 138, 140, respectively, and can be moved along the respective tracks to be nearer or farther from the articulating arm 62. The movement of the shuttles 130, 132, 134 is controlled by the controller 35. Although four fluid exchanging apparatuses 14 are illustrated on each shuttle 130, 132, 134, it would be appreciated by one having ordinary skill in the art that more or less fluid exchanging apparatuses may be present on a given shuttle.

At 310, the articulating arm 62 will insert the fluid exchanging head 13 into the opening 203 of the IGU 100 (see FIGS. 12 and 20). The fluid exchanging head 13 is aligned with the opening 203 and the articulating arm 62 advances the fluid exchanging apparatus 14 toward the IGU 100 until the support magnet 42 or support clamp 43 engages the front face 50 (see FIGS. 12 and 20). It would be appreciated by one having ordinary skill in the art, that though IGUs 100 having double pane glass is shown, multi-pane IGUs (e.g., such as triple pane windows having two spacer frames, two openings, and three glass lites) are contemplated and would be filled in a same manner as the double pane IGUs. At 312, an optional step comprising uncoupling the fluid exchanging apparatus 14 from the articulating arm 62, is illustrated, wherein the fluid exchanging apparatus maintains its position utilizing the support magnet 42. At 320, an optional step comprises repeating steps 308-312 for each set of coordinates identified and probed. The articulating arm 62, once uncoupled, will couple to one or more additional fluid exchanging apparatuses as needed to evacuate/fill the determined number of IGUs based upon the number of openings identified and probed. The articulating arm 62 will sequentially couple to the fluid exchanging apparatuses 14 from nearest to farthest on a particular shuttle, and will remove all fluid exchanging apparatuses from the nearest shuttle. Once all fluid exchanging apparatuses 14 have been removed from a given shuttle 130, 132, 134, the controller 35 will instruct a different shuttle to be moved nearest the articulating arm 62 relative to the other shuttles.

At 314, the fluid exchanging apparatus 14 evacuates atmospheric air and dispenses fluid into the IGU 100 through the fluid exchanging head 13 (see FIG. 13). At 316, the controller 35 instructs the fluid exchanging apparatus 14 to stop evacuating atmospheric air and/or dispensing fluid into the IGU 100 when a desired fluid composition is reached. At 318, the fluid exchanging apparatus 14 is re-coupled to the articulating arm 62, which moves the fluid exchanging apparatus and thus removes the fluid exchanging head 13 from the opening 203. The articulating arm 62 then places the fluid exchanging apparatus 14 on the one or more shuttles 130, 132, 134. At 322, an optional step comprises repeating steps 314-318 for each of the one or more additional fluid exchanging apparatuses that are inserted into the one or more identified openings. It would be appreciated by one having ordinary skill in the art, that the time to evacuate/ fill an IGU is dependent on the internal volume of said IGU, and thus, the fluid exchanging apparatuses may not be re-coupled to the articulating arm 62 and removed from the opening(s) in the same order in which the fluid exchanging apparatuses were inserted. It would likewise be appreciated by one having ordinary skill in the art that the fluid exchange apparatus 14 may not return to the one or more shuttles 130, 132, 134, but instead be inserted into another IGU.

Once the fluid exchanging apparatus(es) 14 is/are returned to the one or more shuttles 130, 132, 134, the articulating arm 62 will repeat steps 302-322 using fluid exchanging apparatus located on a different shuttle (e.g., a second shuttle 132) which is moved along the track 138 to be nearer the articulating arm 62. In one example embodiment, while the one or more fluid exchanging apparatuses are filing/evacuating the one or more IGUs, the fluid exchanging system 10 repeats steps 302-312 using the dispensing apparatuses housed in the second shuttle 132, which has been moved to be adjacent the articulating arm 62, while the first shuttle 130 is moved along the track 136 to be farther from the articulating arm 62 than the second shuttle.

The fluid pressure inside the IGU 100 is about 1 atm, which is approximately equal to the atmospheric pressure outside the IGU. As there is no impetus for the external atmospheric air to re-enter the IGU, the articulating arm 62 does not need to immediately remove the fluid exchanging head 13 and insert a rivet, screw, or the like, into the opening 203. Further, as in the example embodiment, there is a 0.2 mm difference in size between the opening diameter 203a and the dispensing head diameter 25, there is little space for the fluid to leave the IGU 100 if the fluid exchanging apparatus is left in the dispensing position 19 for one or more minutes. It would be appreciated by one having ordinary skill in the art, that the articulating arm 62 could engage multiple fluid exchanging apparatuses to concurrently fill multiple IGUs in a manner similar to that described in the method 300 above.

Advantageously, the articulating arm 62 being capable of coupling to multiple fluid exchanging apparatuses can increase IGU production times by decreasing a time needed to fill the IGUs with a desired fluid. Further, the fluid exchanging head 13 is delicate and easily bent. The coordinate determination by the optical sensor system 16 and the conformation of the coordinates and/or the clearance of the opening 203 by the probe 12 decreases the instance of fluid exchanging head 13 damage, as well as damage to the lites 210, 212, resulting from the fluid exchanging head making abrupt contact with said lites.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%. The term "coupled" as used herein is defined as connected or in contact either temporarily or permanently, although not necessarily directly and not necessarily mechanically. A device or structure that is "configured" in a certain way is configured in at least that way, but may also be configured in ways that are not listed.

To the extent that the materials for any of the foregoing embodiments or components thereof are not specified, it is to be appreciated that suitable materials would be known by one of ordinary skill in the art for the intended purposes. All documents referenced herein are incorporated by reference in their entireties and for all purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A fluid exchanging system for use in exchanging fluids in insulating glass units (IGUs) comprising:
    an articulating arm having a plurality of members and arms to allow movement about multiple axes defined by the articulating arm;
    an optical sensor system, coupled to the articulating arm, for identifying an opening in a spacer frame of an IGU; and
    a fluid exchanging apparatus releasably couplable to the articulating arm, the fluid exchanging apparatus comprising a fluid exchanging head for evacuating atmospheric air from the IGU and dispensing fluid into the IGU, the fluid exchanging head coupled to a vacuum, the vacuum evacuates the atmospheric air from the IGU.

2. The fluid exchanging system of claim 1, further comprising a probe attached to the articulating arm for confirming a location and clearance of the opening.

3. The fluid exchanging system of claim 2, wherein the probe comprises a proximity sensor to identify obstructions near the opening and prevent physical interaction of the probe with one or more glass lites comprised in the IGU.

4. The fluid exchanging system of claim 1, wherein the fluid exchanging apparatus comprises a support magnet, said support magnet interacting with a surface near the IGU to support the fluid exchanging apparatus in a dispensing position absent coupling to the articulating arm.

5. The fluid exchanging system of claim 1, wherein the fluid exchanging apparatus comprises a fluid exchanging head coupled to a fluid reservoir and the vacuum, the fluid exchanging head extending away from a support head of the fluid exchange apparatus from a trailing end to a leading end.

6. The fluid exchanging system of claim 5, wherein the fluid exchanging apparatus comprises a support clamp, said support clamp coupling to a surface adjacent to the IGU to support the fluid exchanging apparatus in a dispensing position absent coupling to the articulating arm.

7. The fluid exchanging system of claim 6, the fluid exchanging head comprising a first length measured from the leading end to the trailing end, the support clamp supported by a support extension comprises an attachment length between the head support and support clamp, the first length is greater than the attachment length.

8. The fluid exchanging system of claim 7, further comprising a probe attached to the articulating arm for confirming a location and clearance of the opening, the probe having a probe length that is less than the attachment length.

9. The fluid exchanging system of claim 1, wherein the articulating arm is coupled to an attachment apparatus that releasably couples to the fluid exchanging apparatus via a tool support arrangement that couples to a tool connector of the fluid exchanging apparatus.

10. The fluid exchanging system of claim 9, wherein the optical sensor system is longitudinally adjacent and recessed relative to the attachment apparatus.

11. The fluid exchanging system of claim 9, wherein the optical sensor system is laterally adjacent the attachment apparatus, wherein the attachment apparatus laterally spaces the optical sensor system from the alignment apparatus.

12. The fluid exchanging system of claim 1, further comprising a controller in instructive communication with at least one of the articulating arm, the optical sensor system, and the fluid exchanging apparatus, wherein at least one of the articulating arm, the optical sensor system, and the fluid exchanging apparatus are enabled and actuated by instructions from the controller.

13. The fluid exchanging system of claim 12, further comprising one or more shuttles that house one or more fluid dispensing apparatuses, wherein the articulating arm releasably couples to the one or more fluid dispensing apparatuses housed in the one or more shuttles responsive to instruction from the controller.

14. A fluid exchanging system for use in exchanging fluids in insulating glass units (IGUs) comprising:
- an articulating arm having a plurality of members and arms to allow movement about multiple axes defined by the articulating arm;
- an optical sensor system, coupled to the articulating arm, for identifying an opening in a spacer frame of an IGU;
- a probe attached to the articulating arm for confirming a location and clearance of the opening;
- a fluid exchanging apparatus releasably couplable to the articulating arm, the fluid exchanging apparatus comprising a fluid exchanging head for evacuating atmospheric air from the IGU and dispensing fluid into the IGU; and
- a controller in instructive communication with at least one of the articulating arm, the optical sensor system, and the fluid exchanging apparatus, wherein at least one of the articulating arm, the optical sensor system, and the fluid exchanging apparatus are enabled and actuated by instructions from the controller.

15. The fluid exchanging system of claim 14, wherein the optical sensor system is laterally adjacent the attachment apparatus.

16. The fluid exchanging system of claim 14, wherein the attachment apparatus laterally spaces the optical sensor system from the alignment apparatus, further wherein the optical sensor system is longitudinally adjacent and recessed relative to the attachment apparatus.

17. The fluid exchanging system of claim 14, wherein the probe comprises a proximity sensor to identify obstructions near the opening and prevent physical interaction of the probe with one or more glass lites comprised in the IGU.

18. The fluid exchanging system of claim 14, wherein the fluid exchanging apparatus comprises an attachment mechanism, said attachment mechanism interacting with a surface of a support of the IGU to support the fluid exchanging apparatus in a dispensing position absent coupling to the articulating arm.

19. A fluid exchanging system for use in exchanging fluids in insulating glass units (IGUs) comprising:
- an articulating arm having a plurality of members and arms to allow movement about multiple axes defined by the articulating arm;
- a probe attached to the articulating arm for confirming a location and clearance of an opening in a frame of the IGU;
- a fluid exchanging apparatus releasably couplable to the articulating arm, the fluid exchanging apparatus comprising a fluid exchanging head defining a first flow path for evacuating atmospheric air from the IGU and a second flow path for dispensing fluid into the IGU, the fluid head evacuating and dispensing.

20. The fluid exchanging system of claim 19, wherein the probe comprises a proximity sensor to identify obstructions near the opening and prevent physical interaction of the probe with one or more glass lites comprised in the IGU.

* * * * *